(12) United States Patent
Alexeevich et al.

(10) Patent No.: US 10,146,678 B2
(45) Date of Patent: Dec. 4, 2018

(54) TEST BUNDLING AND BATCHING OPTIMIZATIONS

(71) Applicant: Oracle International Corporation, Redwood City, CA (US)

(72) Inventors: Barilov Alexey Alexeevich, St. Petersburg (RU); Davidov Mikhail Borisovich, St. Petersburg (RU)

(73) Assignee: Oracle International Corporation, Redwood City, CA (US)

( * ) Notice: Subject to any disclaimer, the term of this patent is extended or adjusted under 35 U.S.C. 154(b) by 305 days.

(21) Appl. No.: 14/404,326

(22) PCT Filed: May 15, 2014

(86) PCT No.: PCT/RU2014/000345
§ 371 (c)(1),
(2) Date: Nov. 26, 2014

(87) PCT Pub. No.: WO2015/174883
PCT Pub. Date: Nov. 19, 2015

(65) Prior Publication Data
US 2016/0140033 A1 May 19, 2016

(51) Int. Cl.
*G06F 11/36* (2006.01)
*H04L 29/08* (2006.01)

(52) U.S. Cl.
CPC ...... *G06F 11/3696* (2013.01); *G06F 11/3688* (2013.01); *G06F 11/3692* (2013.01); *H04L 67/10* (2013.01)

(58) Field of Classification Search
CPC ............ G06F 11/3688; G06F 11/3696; G06F 11/3692; H04L 29/08; H04L 29/06; H04L 69/16; H04L 67/10
See application file for complete search history.

(56) References Cited

U.S. PATENT DOCUMENTS 5,490,249 A 2/1996 Miller
5,751,941 A 5/1998 Hinds et al.
(Continued)

FOREIGN PATENT DOCUMENTS

RU 2496138 10/2013

OTHER PUBLICATIONS

International Search Report for PCT/RU2014/000345, dated Apr. 29, 2015, Oracle International Corporation et al., pp. 1-8.

*Primary Examiner* — Ziaul A Chowdhury
(74) *Attorney, Agent, or Firm* — Robert C. Kowert; Meyertons, Hood, Kivlin, Kowert & Goetzel, P.C.

(57) ABSTRACT

Test bundling and batching by a test execution framework may be customized in accordance with test suite requirements for testing platform implementations on network-connected, resource-limited devices. Tests, test data and test results may be communicated in bundles or batches. Multiple tests may be bundled into a test application bundle and communicated over a single data connection. Test data for the tests in a bundle may be packaged into a single batch and transferred using a single data connection. Similarly, results from executing the tests in a test application bundle may be batched and transferred together over a single connection. Additionally, a custom user interface may be utilized to allow for customizing the test bundling policy for individual test suites. Providing the ability for a user to customize the test bundling policy may significantly reduce the number of data connections required during test suite execution.

20 Claims, 12 Drawing Sheets

(56) References Cited

U.S. PATENT DOCUMENTS

| | | | |
|---|---|---|---|
| 5,948,069 A * | 9/1999 | Kitai | H04L 29/06 370/409 |
| 6,219,829 B1 | 4/2001 | Sivakumar et al. | |
| 6,260,065 B1 | 7/2001 | Leiba et al. | |
| 6,378,088 B1 | 4/2002 | Mongan | |
| 6,397,378 B1 | 5/2002 | Grey et al. | |
| 6,401,135 B1 * | 6/2002 | Chang | G06F 11/3696 714/E11.207 |
| 6,502,102 B1 | 12/2002 | Haswell et al. | |
| 6,510,402 B1 * | 1/2003 | Logan | G06F 11/3696 702/186 |
| 6,574,578 B1 * | 6/2003 | Logan | G06F 11/3696 702/122 |
| 6,580,726 B1 * | 6/2003 | Kumpf | H04L 29/06 370/462 |
| 6,708,324 B1 | 3/2004 | Solloway et al. | |
| 6,804,709 B2 | 10/2004 | Manjure et al. | |
| 7,010,454 B1 | 3/2006 | Potter, IV et al. | |
| 7,032,212 B2 | 4/2006 | Amir et al. | |
| 7,159,021 B2 | 1/2007 | Boldman et al. | |
| 7,366,955 B2 | 4/2008 | Kuturianu et al. | |
| 7,483,694 B2 * | 1/2009 | Varanda | H04M 1/24 379/1.01 |
| 7,836,346 B1 | 11/2010 | Davidov et al. | |
| 7,979,532 B2 | 7/2011 | Klonover et al. | |
| 8,065,662 B1 | 11/2011 | Trounine et al. | |
| 8,335,601 B2 * | 12/2012 | Sham | B64F 5/60 340/3.1 |
| 8,719,119 B1 | 5/2014 | Wargin et al. | |
| 8,812,733 B1 * | 8/2014 | Black | H04L 67/10 709/246 |
| 8,850,398 B1 * | 9/2014 | L'Heureux | G06F 11/3692 705/7.25 |
| 9,274,935 B1 * | 3/2016 | Lachwani | G06F 11/3688 |
| 2001/0012986 A1 * | 8/2001 | Conan | G06F 11/3688 702/188 |
| 2001/0053961 A1 | 12/2001 | Liu et al. | |
| 2001/0056492 A1 * | 12/2001 | Bressoud | H04L 29/06 709/227 |
| 2002/0188730 A1 * | 12/2002 | Tang | H04L 29/06 709/227 |
| 2003/0074606 A1 | 4/2003 | Boker | |
| 2003/0121003 A1 | 6/2003 | Soshalsky et al. | |
| 2003/0188298 A1 | 10/2003 | Shaposhnick | |
| 2004/0148590 A1 | 7/2004 | Lapitski et al. | |
| 2004/0205406 A1 | 10/2004 | Kaliappan et al. | |
| 2004/0236843 A1 * | 11/2004 | Wing | H04L 29/06 709/219 |
| 2004/0243881 A1 | 12/2004 | Wang et al. | |
| 2005/0044533 A1 | 2/2005 | Nesbit et al. | |
| 2005/0172268 A1 | 8/2005 | Kuturianu et al. | |
| 2005/0188262 A1 * | 8/2005 | Rosenman | G06F 11/2294 714/25 |
| 2006/0031472 A1 * | 2/2006 | Rajavelu | H04L 63/0263 709/224 |
| 2006/0259629 A1 * | 11/2006 | Usmani | G06F 11/3688 709/227 |
| 2007/0006041 A1 | 1/2007 | Brunswig et al. | |
| 2007/0198970 A1 * | 8/2007 | Horii | G06F 11/3688 717/124 |
| 2008/0072050 A1 * | 3/2008 | Klonover | H04L 12/2697 713/176 |
| 2008/0104575 A1 * | 5/2008 | Fan | G06F 11/36 717/124 |
| 2008/0209275 A1 * | 8/2008 | Kwan | G06F 11/3688 714/38.14 |
| 2009/0006897 A1 | 1/2009 | Sarsfield | |
| 2009/0182868 A1 * | 7/2009 | McFate | G06F 9/5027 709/224 |
| 2009/0197233 A1 * | 8/2009 | Rubin | G06Q 10/10 434/322 |
| 2009/0271351 A1 | 10/2009 | Kandasamy et al. | |
| 2010/0211626 A1 * | 8/2010 | Li | H04L 67/2861 709/203 |
| 2013/0254832 A1 | 9/2013 | Kvartskhava et al. | |
| 2013/0275946 A1 | 10/2013 | Pustovit et al. | |
| 2014/0289418 A1 * | 9/2014 | Cohen | G06F 11/3688 709/226 |

* cited by examiner

Test Data Package 500

Test Data 520A

Test Results Package 600

Test Results Package 620A

TEST BUNDLING AND BATCHING OPTIMIZATIONS

BACKGROUND

Tradition systems for testing network-connected devices, especially resource-limited mobile devices, typically utilize a test framework that may include a set of test harness plug-ins providing support for the platform or operation system under test. A testing framework may use the test harness for test execution and test suite management.

Frequently, the total number of tests in a test suite is extremely large, such as might be due to the variety and complexity of the platform and/or implementation being tested. Generally, tests may be executed by downloading a test application and running it on the test device. The total time required to execute a test suite may depend on the number of test applications being downloaded because the overall execution time may increase with increased network connectivity, as well the time needed for installation and/or launching of each test application. This may be especially significant for test devices with limited processing power, memory, and network bandwidth.

Traditionally, test frameworks require that the data for each test and the results of executing that test be communicated separately, from each other and from test data and results for other tests. That is, the test data for a particular test is communicated using a data channel established specifically for communicating that test's test data. Similarly, a new data channel may be established for communicating the data results of a particular test. Thus, even if multiple test applications may be bundled together for transfer, each test being executed may require two additional connections—one to communicate test data and another to communicate test results after test execution.

In some cases the total number of connections may equal the number of application downloads plus twice the number of tests in the test suite. For example, a test suite with 10000 tests and 50 tests per a bundle may require at least 200 connections (e.g., 10000 tests/50 tests per bundle) for downloading the test applications plus 20000 connections for test execution (e.g., 2 connections per each 10000 test). The large number of required connections may significantly increase the test suite execution time, especially for testing devices that have limited processing power, memory, and network bandwidth.

SUMMARY

Described herein are various embodiments of systems and methods for optimizing test bundling and batching of test data and test results when testing network-connected devices. According to various embodiments, the bundling policy implementation of a test execution framework configured to manage the execution of multiple tests on a test device may be customized (or modified) in accordance with test suite requirements.

In some embodiments, test data and test results may be processed and communicated in batches. Batch processing for test data and results may involve the packaging of test data (e.g., as a batch) for the tests in a single test application bundle. Similarly, results from executing the tests in a test application bundle may also be batched together for transfer. Thus, rather than requiring two additional data connections for each test being executed, only a single pair of data connections (one for a batch of test data and one for a batch of test results) may be required for each bundle of tests being executed. Additionally, in some embodiments, this may mean that the bundling/batching of test applications, test data and test results may be consistent across the test suite. In other words, if a group of test application are bundled and communicated together (e.g., from a test server device to a test device) the test data for the tests in that bundle may be communicated in a batch and the results from executing those tests may also be communicated in a batch.

Additionally, in some embodiments, a custom user interface may be utilized to collect user input specifying test bundling customization data to customize (or modify) a test bundling policy for individual test suites. The test execution framework may execute the test suite in accordance with the modified test bundling policy. For example, the test framework may combine multiple tests into a test application bundle for transfer to the device being testing (e.g., the test device) according to user specified test bundling customization data. Providing the ability to customize the test bundling policy may significantly reduce the number of application bundles, and therefore the number of test data batches and test results batches, required during test suite execution, according to some embodiments.

Thus, in some embodiments, the total number of connections established during test suite performance may equal three times the number of test application bundle downloads. For example, a test suite with 10000 tests using 50 tests per a bundle may require only 200 application bundles plus 200 test data batches plus 200 test results batches (e.g., 600) connections, instead of 20200 without optimization (e.g., 200 test application bundles, 10000 test data batches, 10000 test results batches). Thus, batching of test data and test results may significantly reduce the test suite execution time, according to some embodiments, especially for testing devices that have limited processing power, memory, and network bandwidth. In one particular embodiment, execution time of a Connected Limited Device Configuration (CLDC) Technology Compatibility Kit (TCK) test suite for a mobile platform, such as a CLDC-TCK11a test suite on the KEIL platform for a Java Mobile Edition (e.g., JME-E 3.3) project, may be reduced from 21 hours to 1 hour 40 min, which is about 12.6 times.

DETAILED DESCRIPTION OF EMBODIMENTS

Figure 1:
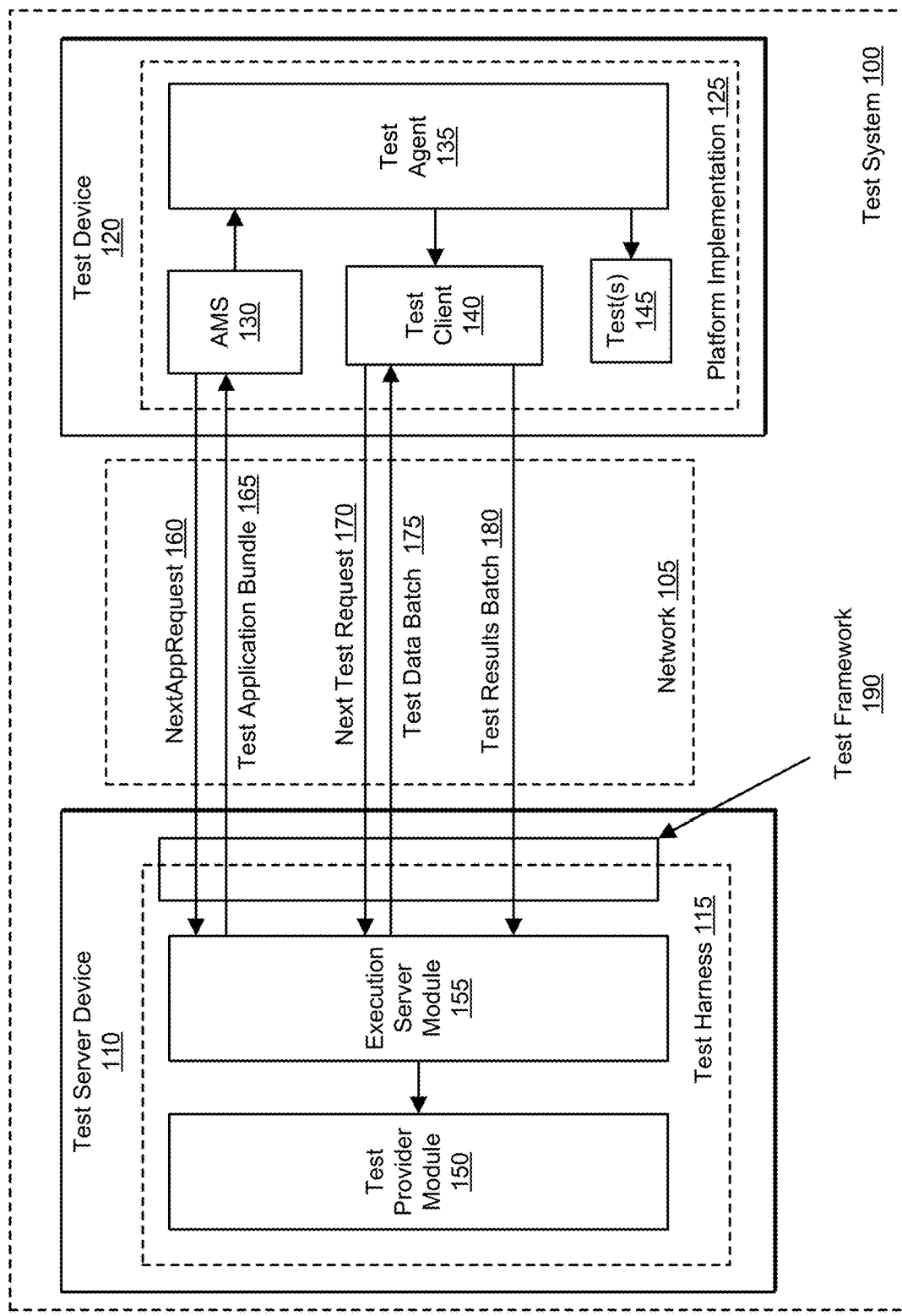
FIG. 1 is a logical block diagram illustrating one embodiment of a system implementing test bundling and batching optimizations, as described herein.

Described herein are various embodiments of systems and methods for optimizing test bundling and batching of test data and test results when using a test framework to test a particular operating system implementation on network-connected resource-limited devices. According to various embodiments, the test bundling policy implemented by a test execution framework may be customized in accordance with test suite requirements, rather than implemented based on hardcoded requirements. In some embodiments, a custom user interface may be utilized to allow a user (e.g., a test designer, developer or operator) to customize the test bundling policy for individual test suites. The test framework may then execute the test suite in accordance with the specified test bundling policy. Providing the ability for a user to customize the test bundling policy may significantly reduce the number of application downloads required during test suite execution.

Additionally, in some embodiments, test data and test results may be processed and communicated in batches over data connections between a test server and a test device. In some embodiments, data connections (or simply connections) may be established according to a connection-based communication protocol, used over a network or other communication media.

A connection-based communication protocol may be considered a communication mode in which a prearranged, fixed data channel or session (e.g., a communication session) may be established prior to transferring any data. In contrast, a connectionless protocol by allow data (e.g., messages) to be sent without any prior arrangement. In some embodiments, connections of a connection-based communication protocol may be semi-permanent and connections may be opened (e.g., established) and closed as needed between two devices. Frequently, a connection-based communication protocol may ensure that data is delivered in the same order that it was sent, in contrast to a connectionless protocol which may not ensure that data is delivered in the same order that it was sent.

In some embodiments, a connection-based communication protocol may be implemented on top of a lower-level, possibly connectionless, protocol—allowing data to be delivered in order although the lower layer switching is connectionless. While a connectionless protocol may utilize data units that are individually addressed and routed based on information carried in each unit, in a connection-based protocol all data packets belonging to the same traffic stream may be delivered over the same path, using traffic flows identified by some a connection identifier.

In some embodiments, a connection-based communication protocol may represent any of numerous protocols, including but not limited to: Transmission Control Protocol (TCP), Asynchronous Transfer Mode (ATM), or Connection-oriented Ethernet, among others.

Batch processing for test data and results may involve packaging (e.g., batching) test data for the tests in a test application bundle. Similarly, the results from executing the tests in a test application bundle may be communicated in batches. Thus, rather than requiring two additional connections for each test being executing, only a single pair of connections (one for a batch of test data and one for a batch of test results) may be required for each bundle of tests being executed. This may significantly reduce the test suite execution time, according to some embodiments, especially for testing devices that have limited processing power, memory, and network bandwidth. For example, execution time of a CLDC-TCK11a test suite on the KEIL platform for JME-E 3.3 project may be reduced from 6 hours to 1 hour 40 min, which is about 3.6 times.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram illustrating one embodiment of a system for implementing test bundling and batching optimizations, as described herein. FIG. 1 illustrates Test System 100, including the communication channel components and the main data flows between them. As illustrated in FIG. 1, testing of a particular operating system platform implementation, such as Platform Implementation 125 may be performed utilizing a test server device, such as Test Server Device 110. Additionally, various software (and/or firmware) modules may be utilized on the test server device, such as Test Harness 115, Test Framework 190, Test Provider Module 150 and Execution Serer Module 155. The test harness and test framework may be used for test execution and test suite management.

In some embodiments, a test harness, such as Test Harness 115 may be a set of tools designed to run and manage test suites on different Operating System (OS) platforms, such Platform Implementation 125 on Test Device 120. For example, a test suite suitable for testing various implementations of a platform independent object oriented language, such as Java™ may be used to perform test suites on test devices configured to execute those implementations, according to various embodiments. In one example embodiment, Platform Implementation 125 may represent a Java platform, such as a Java Micro Edition (Java ME) implementation. As another example, Java Mobile Edition (ME) TCK™ is a test suite including a set of tools that may be used to certify that a particular implementation of Java technology conforms to the applicable Java platform specifications. Test architects may use the JavaTest™ harness and ME TCK Framework to build new test suites for Java ME technologies, according to various embodiments.

In some embodiments, tests may be executed on network-connected, resource-limited, mobile devices to test verify compliance of various implementations of a platform-independent, object oriented language, such as to test Java Mobile Edition platform implementations. Additionally, according to one embodiment, the Test Framework 190 may represent a set of test harness plugins, such as the ME TCK Framework, that provides support for the OS platform being tested. Together the test harness and framework may be used to build new test suites, such as Oracle Java ME TCK CLDC-based test suites, for testing compliance of OS technologies, such as the Java ME technologies.

In some embodiments, one way to load test code on a test device is to download applications through a communication channel, such as according to a connection-based communication protocol.

In general, the testing of virtually any operating system implementation may utilize the test bundling and batching optimizations described herein according to various embodiments. For example, in one example embodiment, Oracle Java ME TCK CLDC-based test suites may be used to test and/or verify Java ME technology implementations on the test device. In such an example embodiment, Test Harness 115 may represent the JavaTest (JT) harness and Test Framework 190 may represent the Java Micro Edition TCK Framework.

As noted above, when testing an operating system implementation, the total number of tests may be quite large. For example, in one embodiment using Java ME technologies, the total number of automated tests in the test suites may include 57,000 tests. Execution time of a test suite may significantly depend on the number of test application downloads because each test application requires network connectivity as well as the time involved to install the application and launch the test agent. For example, a customized test bundling policy for a CLDC-TCK11a test suite may reduce the number of application downloads up to 25 times and reduce test suite execution time 3.4 times, as compared to the traditional, hard-coded test bundling policy implementation. In one particular embodiment, execution time of a CLDC-TCK11a test suite on the KEIL platform for JME-E 3.3 project may be reduced from 21 hours to 6 hours, which is about 3.5 times.

In some embodiments, test applications may be bundled together into tests application bundle for transfer between the test server device and the test device. For instance, test bundling may be a feature provided by the test framework to extend the functionality of the test harness. For example, the Java ME TCK Framework may provide test bundling to extend the functionality of the JT harness for CLDC-based test suites, according to one example, embodiment Tests executed on network-connected, resource-limited test devices, such as devices that may have limited processing power, memory, and network bandwidth may load test code onto the test device by downloading tests applications through a communication channel. Each download may contain multiple tests, as well as possibly a small agent to execute the tests and report test results back to the test harness.

Communication Channel Components and Data Flow

According to various embodiments, responsibility for coordinating and running tests may be divided between two (or more) cooperating components. As illustrated in FIG. 1, Test Provider Module 150, running on Test Server Device 110 as part of Test Harness 115, may coordinate the test run, directing execution of tests and recording results. On Test Device 120, Test Agent 135 may execute tests as directed by the Test Provider Module 150 and may return test results to Test Provider Module 150.

Test Server Device 110 may represent a personal computer, workstation or other computing device configured to manage the execution of a test suite on Test Device 120. Test Provider Module 150 and Test Agent 135 may use the communication channel(s) over Network 105 to exchange information. Test Agent 135 may ask the Test Provider Module 150 (via Execution Server Module 155) for the name and parameters of the next test to execute. After running a test, Test Agent 135 may send test results to the Test Provider Module 150. Various other modules may perform the actual communication and thus may insulate the Test Provider Module 150 and Test Agent 135 from communication specifics.

For instance, in some embodiments a communication channel may involve three components: Test Client 140, Execution Server Module 155 and application management software (AMS) 130. Test Client 140 may perform communication tasks for Test Agent 135. For example, in one embodiment, Test Agent 135 may call one or more methods exposed by Test Client 140 in order to get test data (e.g., which test to run next and what parameters values to pass it) from the Test Provider Module 150, as well as to send test results to Test Provider Module 150.

Thus, a test provider module may act as a server to an execution server module. In some embodiments, the execution server module is configured to call methods exposed by the test provider module to pass the data from a test agent to the test provider module and vice versa.

As noted above, bundling of multiple test applications may reduce the test suite execution time, according to some embodiments, especially for testing devices that have limited processing power, memory, and network bandwidth. For instance, the number of connections between the test harness and the test device may be reduced by modifying format of exchanging information between Test Provider Module 150 and Test Agent 135 without requiring modification to communication channel components, such as Execution Server Module 155, Test Client 140 and AMS 130. In some embodiments, AMS 130 may represent a software component configured to obtain and launch applications within Platform Implementation 125.

Test Data Batch Processing

As noted above, test application bundling may involve packaging tests into downloadable test application bundles. One or more tests may be combined together in a test application bundle for transfer between a test server device and a test device. For instance, a test framework on a test server device may bundle multiple tests into a test application bundle and send that bundle to a test device. The test device may then process the test application bundle and execute the tests in the bundle. Test application bundling may reduce the number of application downloads as well as the number of the connections required during execution of a test suite. However, traditionally, the total number of connections necessary for the test suite execution may remain high because each test execution traditionally requires two new connections (e.g., one to transfer test data and one to transfer test results).

When processing the test application bundle, AMS 130 may first launch the test agent application, such as Test Agent 135, that was downloaded as part of the test application bundle. Test Agent 135 may then launch a test client, such as Test Client 140. In some embodiments, Test Client 140 may perform communication tasks for Test Agent 135. For example, Test Agent 135 may have no knowledge of how to contact the test server device (or any module executing on the test server device) and may rely on Test Client 140 to conduct communications for it. Similarly, Test Client 140 may have no knowledge of test-related information or data. Thus, Test Client 140 may, in some embodiments, simply enable communicate between Test Agent 135 and Test Server Device 110.

In the same way that the Test Client 140 may be the communication back end for Test Agent 135, the Execution Server Module 155 may be the communication front end for the Test Provider Module 150. In response to requests made by the Test Client 140, the Execution Server Module 155 may call methods of (or otherwise communicate with) Test Provider Module 150 to obtain information for Test Client 140 (which Test Client 140 may return to Test Agent 135). Execution Server Module 155 may also function as an intermediary between AMS 130 and Test Provider Module 150. AMS 130 may by a software component that knows how to obtain and launch a test application. During a test run, AMS 130 may act as the "main loop" on the test device. For example, it may ask Execution Server Module 155 for a test application bundle, which may include Test Agent 135 and a collection of tests for the Test Agent 135 to run. After downloading the test application bundle, AMS 130 may launch Test Agent 135 on Test Device 120, such as within Platform Implementation 125. After launching Test Agent 135, AMS 130 may ask Execution Server Module 155 for another application bundle. If there are additional tests to be run, Execution Server Module 155 may provide another test application bundle. If, however, there are no more tests to execute, Execution Server Module 155 may reply that there are no more test application bundles and the test suite may be considered finished.

AMS 130 may request a test application bundle by sending a request to Test Server Device 110. For instance, AMS 130 may issue a getNextApp command, such as NextAppRequest 160, to Execution Server Module 155 on Test Server Device 110, according to some embodiments. For instance, to send the getNextApp command AMS 130 may open a new connection according to a connection-based communications protocol used over Network 105. Additionally, the particular AMS implementation may be device specific and different AMS implementations may be used on different test devices.

Network 105 may represent and/or comprise virtually any network technology in various embodiments. Network 105 may be a local area network, wide area network, intranet network, Internet network, or virtually any other type of private or public network. Network 105 may be designed to be continuously available (although network outages may occur), or may be intermittent (e.g. a modem or other temporary connection made between two computer systems, according to various embodiments.

The Execution Server Module 155 may receive the request, either directly or via Test Framework 190 and/or Test Harness 115 and may return a test application bundle, such as Test Application Bundle 165, to ASM 130 over the connection established by AMS 130. Alternatively, Execution Server Module 155 may return an indication that there are no additional tests to be executed. AMS 130 may download the test application bundle and, in some embodiments, close any connection used to download the test application bundle. AMS 130 may then unpack the tests from the bundle and launch the test agent on the test device.

Figure 2:
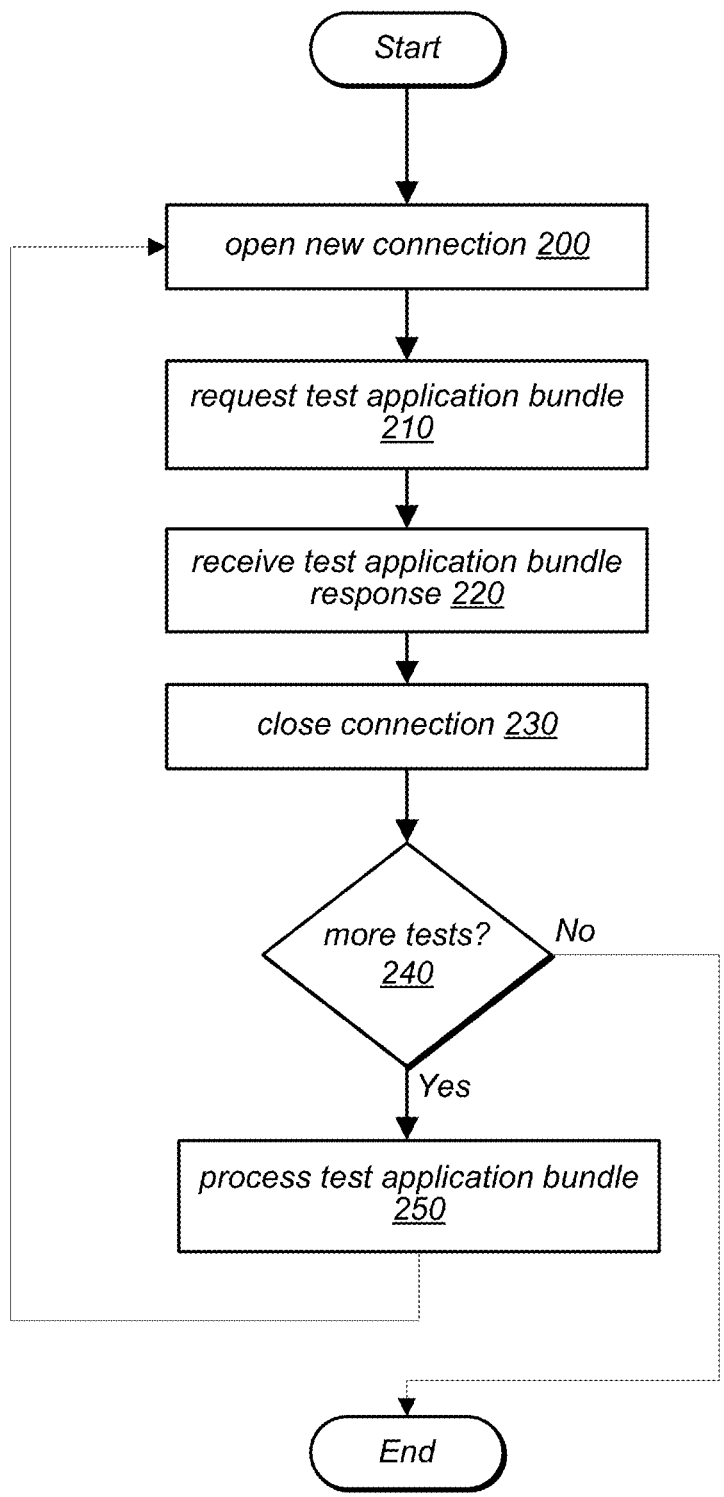
FIG. 2 is a flowchart illustrating one embodiment of a method for test bundling and batching optimizations, as described herein.

FIG. 2 illustrates one embodiment of a method for obtaining test application bundles, such as by AMS 130. As shown by block 200, AMS 130 may open a new connection, such as according to a connection-based communication protocol, over which AMS 130 may communication with Test Server Device 110. AMS 130 may then request a test application bundle from Test Server Device 110, as shown in block 210. The request may be received by Test Framework 190 and then passed on Test Harness 115, in some embodiments, before being serviced by Execution Server Module 155, possibly by communicating with Test Provider Module 150. Test Server Device 110 may then respond by either providing a test application bundle, or by indicating that there are no more tests to execute. Thus, AMS 130 may receive a test application bundle response from Test Server Device 110, as shown in block 220. AMS 130 may then close the connection as illustrated by block 230.

As noted above, a single connection may be used to send all the tests in the test application bundle rather than using a separate, individual, connection for each test. In some embodiments, test application bundles may be created by the Test Harness 115 to be communicated to AMS 130. A test application bundle, such as Test Application Bundle 165, may represent a message or downloadable file that includes one or more test applications. In some embodiments, all the tests in the test bundle (e.g., the entire test application bundle) may be communicated over the single connection established by AMS 130 and tests may not be individual communicated over separate, individual connections. In other words, a single connection may be used to transfer all the tests in the test application bundle rather than using individual connections to download each test.

Additionally, while discussed herein as a single transfer between Test Server Device 110 and Test Device 120, the downloading of a test application bundle may, in some embodiments, involve multiple communications between the two devices. For instance, in one embodiment, AMS 130 may issue NextAppRequest 160 and Execution Server Module 155 may first respond by sending an application descriptor that describes the one or more test applications to be downloaded in the test application bundle. For example, the application descriptor may include one or more filenames or file locations, such as uniform resource locator (URL) strings. AMS 130 may parse the application descriptor and request the individual file(s) according to the information in the application descriptor. In one embodiment utilizing Java technology, a test application bundle may represent a Java archive (JAR) file that includes the test application(s).

If there are additional tests to execute, as illustrated by the positive output of block 240, AMS 130 may then process the test application bundle as illustrated by block 250. For example, after AMS 130 downloads the test application bundle, it may unpack the bundle to retrieve Test(s) 145 and Test Agent 135. AMS 130 may then launch Test Agent 135 on Test Device 120 within Platform Implementation 125. After running one or more tests, Test Agent 135 may send its results to Test Server Device 110. AMS 130 may then request (and possibly download and process) additional test application bundles, as illustrated by the arrow from block 230 returning to block 205.

Alternatively, if there were no tests sent by Test Server 110 in response to the request sent by AMS 130, as indicated by the negative output of block 240, then the test suite may be complete and AMS 130 may exit.

Figure 3:
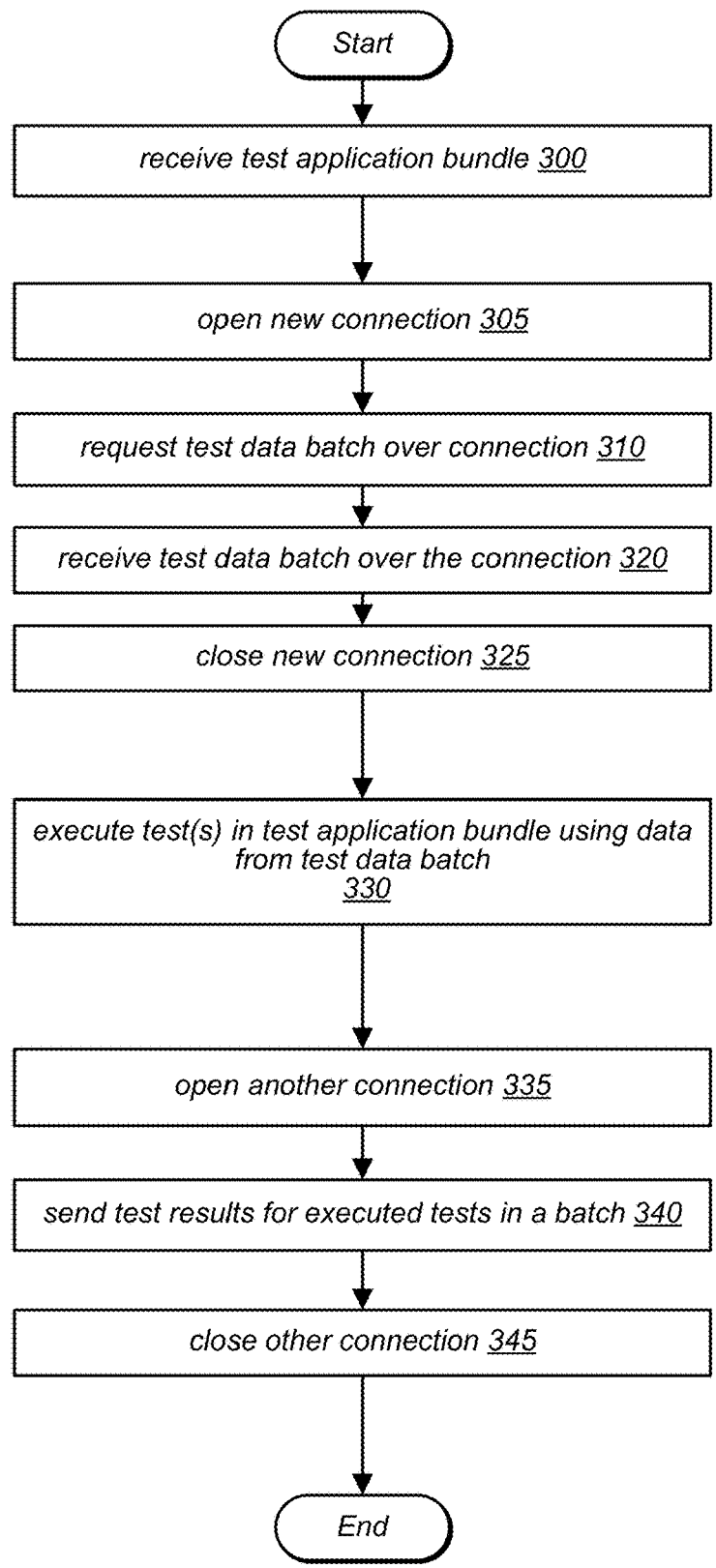
FIG. 3 is a flowchart illustrating one embodiment of a method for test bundling and batching optimizations, as described herein.

Turning now to FIG. 3, which illustrates one embodiment of a method for batching test data and test results, as described herein. After receiving a test application bundle, as shown in block 300, Test Device 120, or a component running on Test Device 120, such as AMS 130, may request a test data batch, as shown in block 310.

For example, once launched by AMS 130, Test Agent 135 may ask Execution Server Module 155 for the name and parameters of the next test to execute. For instance, Test Agent 135 may issue a getNextTest request, such as Next Test Request 170, to Execution Server Module 155. When issuing the getNextTest request Test Agent 135 may utilize Test Client 140 to open a connection according to a connection-based communication protocol, as shown in block 305 and perform the actual communication between Test Device 120 and Test Server Device 110 over that connection.

As shown in block 320, Test Device 120 may receive a test data batch including data for the tests in the test application bundle. For example, in response to receiving Next Test Request 170, Execution Server Module 155 may obtain from Test Provider Module 150 the test names and parameters (e.g., the test data) for all tests in the test application bundle that Test Agent 135 should run. In some embodiments, all of the data for all of the tests previously sent in the test application bundle may be communicated over the same connection used to send Next Test Request 170. In other words, only a single connection may be required to communicate Next Test Request 170 and Test Data Batch 175. Thus, in some embodiments, Next Test Request 170 may be considered a request, sent from the test device to the test server device, for a next batch of test data.

In some embodiments, Execution Server Module 155 may call one or more methods exposed by Test Provider Module 150, such as a TestProvider.getNextTest( ) method, to obtain the test data. Execution Server Module 155 may then send that test data, such as test names and parameters, as a test data batch, such as Test Data Batch 175, to Test Agent 135 via Test Client 140. Test Client 140 may read Test Data Batch 175, close the connection, as shown in block 325, and return a test data package from Test Data Batch 175 to Test Agent 135, according to some embodiments.

Figure 5A:
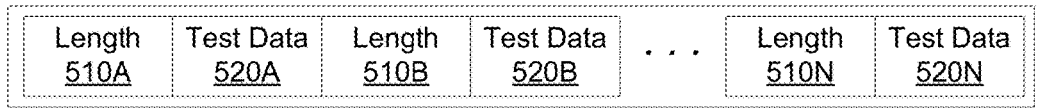
FIG. 5A is a block diagram illustrating an example format for a test data package, according to one embodiment.

The actual manner and format for communicating the names and parameters (e.g., test data) may vary from embodiment to embodiment. FIG. 5A illustrates one example embodiment of a format for communicating test data between Test Server Device 110 and Test Device 120. As shown in FIG. 5A, a test data batch may include a test data package, such as Test Data Package 500, that may comprise an array of bytes including the names and parameters for multiple tests (e.g., the tests in a corresponding test application bundle). Test Data Package 500 shown in FIG. 5A may comprise multiple frames of bytes for each set of test parameters (e.g., Test Data 520A, Test Data 520B . . . Test Data 520N). Preceding each set of test parameters, Test Data Package 500 may include a value indicating the length (e.g., in bytes) of the following test data. For example, in one embodiment, Test Data Package 500 may include 4 byte values to specify the lengths of test parameter frames. Thus, Length 510A specifies the length of Test Data 520A, Length 510B specifies the length of Test Data 520B and so on through Test Data Package 500 ending with Length 510N specifying the length of Test Data 520N.

After a test data Batch, such as Test Data Package 500, is communicated to Test Agent 135 (e.g., via Test Client 140), Test Agent 135 may parse the test data package. For Instance, Test Agent 135 may start parsing Test Data Package 500 and may use the first frame (e.g., Length 510A) to determine the length of a test data frame (e.g., Test Data 520A) in order to obtain the name and parameters for the next test to run.

Figure 5B:
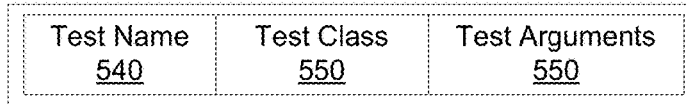
FIG. 5B is a block diagram illustrating, according to one embodiment, an example format of data for a test within a test data package.

FIG. 5B illustrates one example embodiment of a format for a test data frame within a test data package. For instance, FIG. 5B illustrates an example format for the content of Test Data 520A which may include three frames. The first frame, Test Name 540, may include a string indicating a test name for the test. The second frame, Test Class 550, may include a string or other value indicating a class of tests to which the test belongs and the first frame, Test Arguments 550 may include a string representing or more arguments to be used when executing the test. For instance, Test Arguments 550 may represent runtime arguments that may be passed to a test application, in some embodiments.

Returning now to FIG. 3, Test Device 120 may execute the tests in the test application bundle using data from the test data batch, as illustrated in block 330, and may then send results from executing those tests in a test results batch to Test Server Device 110. For example, in one embodiment, Test Agent 135 may execute all of the tests in the test application bundle, collect results from those tests and package the results into a Test Results Package for communication back to Test Server Device 110. Test Agent 135 may utilize Test Client 140 to communicate a test results batch, such as Test Results Batch 180 to Execution Server Module 155. To send Test Results Batch 180 Test Client 140 may open (or establish) another connection, as shown in block 335, and, after sending the test results for the executed tests in a batch, as shown in block 340, may close the other connection as shown in block 345. In other words, Test Client 140 may send all the results from execution all the tests in the test application bundle at one time and over a single connection rather than sending results for individual tests over separate, individual, connections. In some embodiments, the connection may be established for the purpose of sending a test results batch, such as Test Results Batch 180, from the test device to the test server device and may be closed after sending the test results. In other words, the connection may only be used for the purpose of sending the test results batch.

Figure 6A:
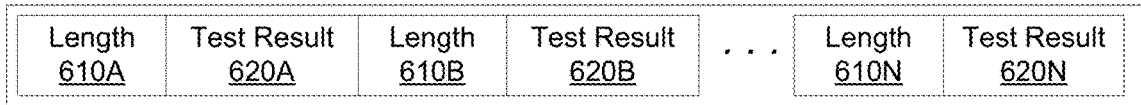
FIG. 6A is a block diagram illustrating one example format for a test results package, according to one embodiment.

The actual manner and format for communicating test results may vary from embodiment to embodiment. FIG. 6A illustrates one example embodiment of a format for communicating test results between Test Server Device 110 and Test Device 120. As shown in FIG. 6A, a test results batch may include a test results package, such as Test Results Package 600, that may comprise an array of bytes including the actual tests results for multiple tests (e.g., the tests in a corresponding test application bundle). Test Results Package 600 shown in FIG. 6A may comprise multiple frames of bytes for each set of test results (e.g., Test Result 620A, Test Result 620B . . . Test Result 620N). Preceding each set of test parameters, Test Results Package 600 may include a value indicating the length (e.g., in bytes) of the following set of test results. For example, in one embodiment, Test Results Package 600 may include 4 byte values to specify the lengths of test results frames. Thus, Length 610A specifies the length of Test Result 620A, Length 610B specifies the length of Test Result 620B and so on through Test Results Package 600 ending with Length 610N specifying the length of Test Result 620N.

After a test results batch, such as Test Results Package 600, is communicated by Test Agent 135 (e.g., via Test Client 140), Execution Server Module 155 (and/or Test Provider Module 150) may parse the test results package. For Instance, Execution Server Module 155 may start parsing Test Results Package 600 and may use the first frame (e.g., Length 610A) to determine the length of a test results frame (e.g., Test Result 620A) in order to obtain the name and parameters for the next test to run.

Figure 6B:
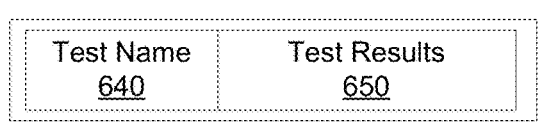
FIG. 6B is a block diagram illustrating, according to one embodiment, an example format of data for test results within a test results package.

FIG. 6B illustrates one example embodiment of a format for a test result frame within a test results package. For instance, FIG. 6B illustrates an example format for the content of Test Result 620A which may include two frames. The first frame, Test Name 640, may include a string indicating a test name for the test. The second frame, Test Results 650, may include a string or other value indicating the results of executing the corresponding test.

After executing a bundle of tests and returning the corresponding test results batch, Test Agent 135 may exit and AMS 130 may request the next test application bundle. This sequence may be repeated until all tests and all test application bundles in the test suite are run.

As noted above, the use of test bundling and batching may reduce the number of connections required to execute all the tests in a test suite. For instance, in one embodiment, only 2 new connections may be required to run all the tests from any one of test application bundles (e.g., one to transfer the test data batch and one to transfer the test results batch). In other words, the total number of connections required to perform all tests from a test suite may equal three times the number of test application bundles. Thus, the total number of connections required to perform all tests from a test suite may on the order of the number of test application bundles, rather than on the order of the number of tests in the test suite, according to some embodiments.

Figure 4:
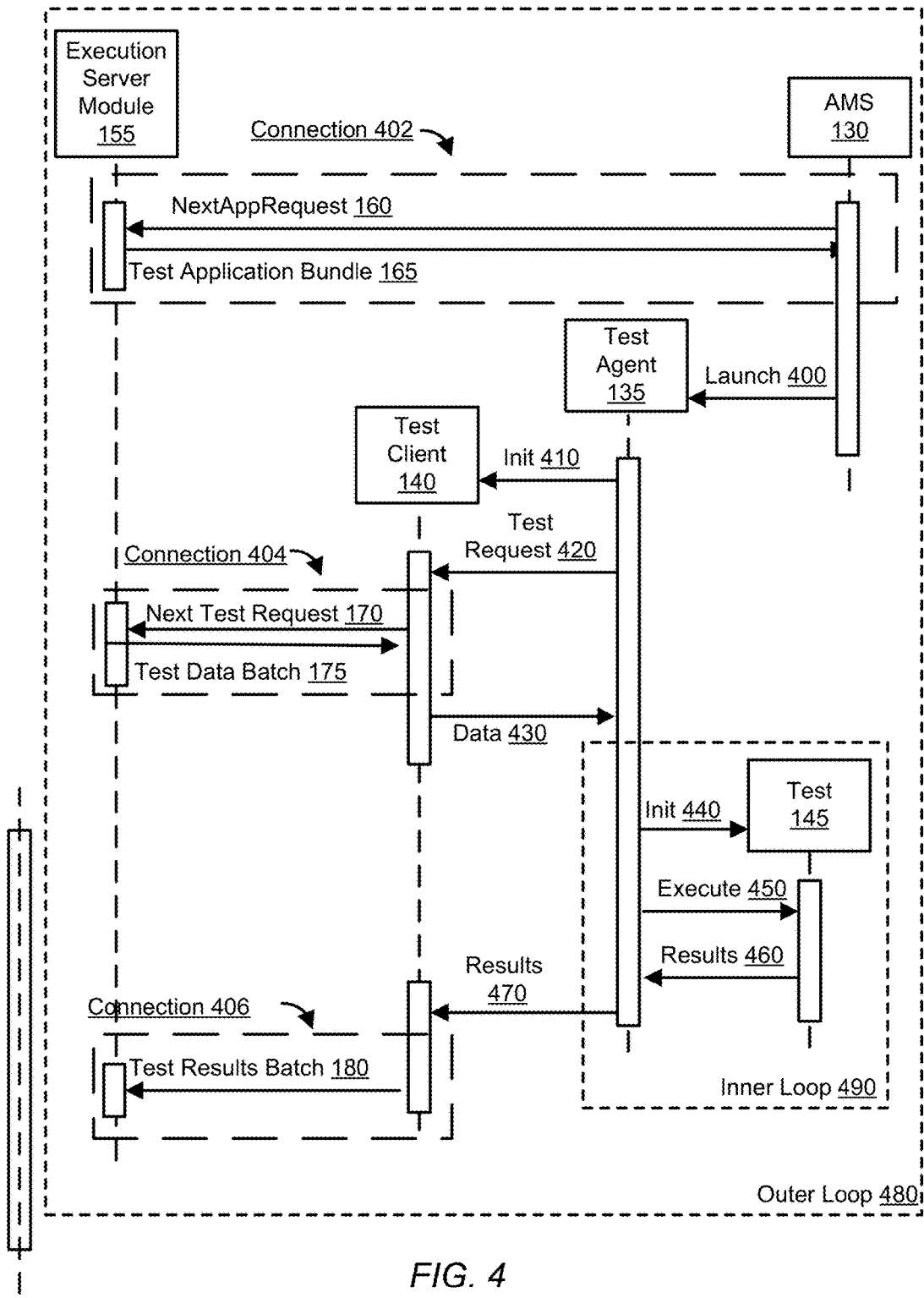
FIG. 4 is a logical block diagram illustrating one embodiment of execution and communication within a system implementing test bundling and batching optimizations, as described herein.

FIG. 4 is a logical diagram illustrating one embodiment of operations and communications between an execution server module and components on the test device during execution of a test suite.

As noted above, an execution server module running on a test server device may send a test application bundle including tests and a test agent to an application management software (AMS) module running on a test device. For instance, as illustrated in FIG. 4, and discussed previously above, AMS 130 may send a NextAppRequest 160 to Execution Server Module 155 and in response, Execution Server Module 155 may send Test Application Bundle 165 to AMS 130.

When requesting and receiving a test application bundle, test device 120 and/or AMS 130 may be configured to first open a connection over which to communicate with test server device 110. For example, AMS 130 may establish Connection 402 between test device 120 and test server device 110 according to a connection-based communication protocol. In some embodiments, a single connection may be used to communicate both the request for a test application bundle and to send the test application bundle and all the tests in the test application bundle may send over that connection. In other words, the individual test in the test application bundle may not be communicated over separate, respective connections of the connections-based communication protocol. AMS 130 may close Connection 402 after successfully receiving (e.g., downloading) the test application bundle, according to some embodiments. Thus, a separate connection may be established for each test application bundle, but all the tests of a bundle may be communicated over the same connection.

AMS 130 may represent a software component configured to obtain and launch applications, such as Java applications according to some embodiments. After AMS 130 downloads the test application bundle, it may unpack the bundle and launch 400 a test agent included in the test application bundle, such as Test Agent 135. Once launched by AMS 130, Test Agent 135 may initialize 410 Test Client 140 in order to request test data (e.g., the names and parameters for tests to execute). After initializing Test Client 140, Test Agent 135 may instruct Test Client 140, such as by calling one or more methods exposed by Test Client 140, represented by Test Request 420 in FIG. 4, to issue Next Test Request 170 to Execution Server Module 155.

In order to send Next Test Request 170 and to receive Test Data Batch 175, test device 120, may utilize another data (e.g., communication) connection with test server device 110. For instance, Test Client 140 may, such as at the behest of Test Agent 135, establish Connection 404 according to a connection-based communication protocol, according to some embodiments. Connection 404 may be used to communicate both Next Test Request 170 and Test Data Batch 175. In some embodiments, all of the test data (e.g., for all of the tests in Test Application Bundle 165) may be communicated together over Connection 404 rather than using separate, individual, connections to send test data for each test. Test Client 140 may then close the connection after receiving Test Data Batch 175. In other words, Test Device 120 may utilize a single data connection with Test Server Device 110 to send the request for a batch of test data and to receive the actual batch of test data.

After receiving Test Data Batch 175 from Execution Server Module 155, Test Client 140 may provide the received test data 430 to Test Agent 135. Test Agent 135 may then proceed to execute the tests in the test bundle using the test data from the test data batch. When executing a test, Test Agent 135 may first launch and/or initialize 440 the actual test application 145 and may, in some embodiments, instruct the test application to actually execute 450 the test to be run. Test 145 may then run the test, determine the result(s) of that test and return the Results 460 to Test Agent 135.

Rather than immediately return the results of the executed test, Test Agent 135 may collect results from all the tests in a test application bundle before providing those results 470 (e.g., all the results from all the test in the test application bundle) to Test Client 140 for communication to Execution Server Module 155 as Test Results Batch 180. Additionally, Test Client 140 may be configured to establish and use Connection 406 to send Test Results Batch 180. Thus, Test Client 140 may open Connection 406 in accordance with a connection-based communication protocol and may send all the results for all the tests in the batch over the same connection rather than using a separate, individual, connection for each test's results.

While a test run in being executed on Test Device 120, the operations performed by AMS 130 may serve as an Outer Loop 480 repeatedly acquiring test application bundles and launching test agents. Similarly execution of the test agent may serve as an Inner Loop 490 repeatedly executing tests in its respective test application bundle.

At each iteration through the outer loop, separate data connections may be established (e.g., between Test Server Device 110 and Test Device 120) and used to communicate information regarding the tests. For example, each time AMS 130 requests another test application bundle, a new connection may be established in order to download the test application bundle. Similarly, a new connection may be opened to download each batch of tests data and yet another connection may be used to send each batch of test results. As noted above, a single connection may be used to communicate all the tests (or all the test data, or all the test results) in each bundle (or batch), and individual tests may not be communicated over separate, individual, connections, according to some embodiments.

When Test Agent 135 determines that there are no more tests left to execute in a particular test application bundle, Test Agent 135 may exit and return control to AMS 130. When AMS 130 determines that there are no more test application bundles to download and process, AMS 130 may exit Outer Loop 490 and the test suite may be completed.

While discussed herein mainly in terms of Java software and testing of Java ME implementations, Test Bundling and Batching Optimizations, as described herein may be applied to test suites executed using virtually any software language and to test virtually any system.

It should be noted that in some embodiments, the use of connections may depend on particular implementations of communication channel components, such as AMS 130, Execution Server Module 155 and/or Test Client 140. For instance, in some embodiments, the design of AMS 130 may be highly dependent on the operating system and communication capabilities of Test Device 120. Accordingly, AMS 130 may be written in a low-level language such as C, according to one embodiment. By contrast, Execution Server Module 155 and/or Test Client 140 may be implemented as Java classes using interfaced defined by the test framework (such as the Java ME TCK framework), according to some embodiments. In some embodiments, the implementation of Execution Server Module 155 and/or Test Client 140 may be based on the hypertext transfer protocol (HTTP) communication protocol and/or the Java 2 Platform, Standard Edition (J2SE) application model. In some embodiments, the particular implementation of Execution Server Module 155 and/or Test Client 140 may allow these modules to be reused across test suites. However, in other embodiments, Execution Server Module 155 and/or Test Client 140 implementation may have to be developed that fit the particular capabilities and/or conventions of the particular test device.

As noted above, a test provider module may act as a server to an execution server module. In some embodiments, the execution server module is configured to call methods exposed by the test provider module to pass the data from a test agent to the test provider module and vice versa. For example, the following example source code illustrates one possible embodiment of an implementation of a test provider module:

```
public class GenericTestProvider implements TestProvider {
    public synchronized byte[ ] getNextTest(String bundleId) {
        if (bundleId.equals("")) {
            Enumeration e = executingBundleTable.keys( );
            if (e.hasMoreElements( )) {
                bundleId = (String) e.nextElement( );
            } else {
                System.err.println("Out of sync!!! Unexpected getNextTest.");
                return null;
            }
        }
        TestBundle executingBundle = (TestBundle) executingBundleTable
                .get(bundleId);
        byte[ ] executingTest = null;
        byte[ ] test = null;
        if (executingBundle == null) {
            System.err.println("Out of sync!!! "
                    + "Received getNextTest, expected getNextApp");
            return null;
        }
        if (executingTestTable.containsKey(bundleId)) {
            if (verbose) {
                System.out.println(verboseId
                        + ": duplicated getNextTest, bundle "
                        + executingBundle.getApp( ));
            }
            if (executingBundle.isInterrupted( )) {
                executingBundle.finishing( );
                executingBundleTable.remove(bundleId);
                executingTestTable.remove(bundleId);
                executingTest = null;
                if (verbose) {
                    System.out
                            .print(verboseId
                                    + ": getNextTest, all tests in the bundle
have been executed, finished (interrupted)");
                    executingBundle.printAppName( );
                }
            } else {
                executingTest = (byte[ ]) executingTestTable.get(bundleId);
                if (verbose) {
                    System.out.print(verboseId + ": getNextTest, executing "
                            + executingBundle.getApp( ) + ",
                                    current test is ");
                }
            }
            return executingTest;
        }
        int testscount = executingBundle.getTestCount( );
        ByteArrayOutputStream os = new ByteArrayOutputStream( );
        test = null;
        try {
            for (int i = 0; i < testscount; i++) {
                test = executingBundle.getNextTest( );
                String testId = UTFConverter.bytesToStrings(test)[0];
                executingTestIdTable.put(testId, test);
                os.write(toByteArray(test.length));
                os.write(test);
            }
            executingTest = os.toByteArray( );
```

```
    } catch (IOException e) {
      System.out.print("IOException is thrown " + e);
      executingTest = null;
    }
    os = null;
    test = null;
    if (testscount == 0 || executingTest == null) {
      // all tests have already been executed
      executingBundle.finishing( );
      executingBundleTable.remove(bundleId);
      executingTestTable.remove(bundleId);
      if (verbose) {
        System.out.print(verboseId
        + ": getNextTest, all tests in the bundle have been executed,
        finished ");
      }
    } else {
      executingTestTable.put(bundleId, executingTest);
      if (verbose) {
        System.out.println(verboseId + ": getNextTest, executing "
          + executingBundle.getApp( ) + ", next tests are:");
        int off = 0;
        int 1 = executingTest.length;
        test = null;
        byte[ ] size = null;
        while (true) {
          if (1 - off < 4)
            break;
          size = new byte[4];
          System.arraycopy(executingTest, off, size, 0, 4);
          off += 4;
          int len = fromByteArray(size);
          test = new byte[len];
          System.arraycopy(executingTest, off, test, 0, len);
          off += len;
          test = null;
          size = null;
        }
      }
    }
    return executingTest;
  }
  private byte[ ] toByteArray(int value) {
    return new byte[ ] {
      (byte) (value >> 24),
      (byte) (value >> 16),
      (byte) (value >> 8),
      (byte) value};
  }
  private int fromByteArray(byte[ ] bytes) {
    return bytes[0] << 24
      | (bytes[1] & 0xFF) << 16
      | (bytes[2] & 0xFF) << 8
      | (bytes[3] & 0xFF);
  }
  public synchronized void sendTestResult(byte[ ] res,
    String bundleId) {
    if (bundleId.equals("")) {
      Enumeration e = executingBundleTable.keys( );
      if (e.hasMoreElements( ))
        bundleId = (String) e.nextElement( );
      else {
        System.err.println("Out of sync!!! Unexpected
        sendTestResult.");
        return;
      }
    }
    TestBundle executingBundle = (TestBundle) executingBundleTable
      .get(bundleId);
    byte[ ] executingTest = (byte[ ]) executingTestTable.get(bundleId);
    if (executingBundle == null) {
      System.err.println("Out of sync!!! Unexpected sendTestResult.");
      return;
    }
  }
  if (executingTest == null) {
    if (verbose) {
      System.out.println(verboseId
        + ": duplicated sendTestResult, bundle "
        + executingBundle.getApp( ));
    }
    return;
  }
  int off = 0;
  int 1 = res.length;
  while (true) {
    if (1 - off < 4)
      break;
    byte[ ] size = new byte[4];
    System.arraycopy(res, off, size, 0, 4);
    off += 4;
    int len = fromByteArray(size);
    byte[ ] result = new byte[len];
    if (1 - off < len)
      break;
    System.arraycopy(res, off, result, 0, len);
    off += len;
    String testId = UTFConverter.bytesToStrings(result)[0];
    byte[ ] test = (byte[ ]) executingTestIdTable.get(testId);
    executingBundle.passTestResult(test, result);
    executingTestIdTable.remove(testId);
    if (verbose) {
      System.out.print(verboseId + ": sendTestResult, bundle "
        + executingBundle.getApp( ) + ", test " + testId);
    }
    test = null;
      result = null;
      size = null;
  }
  executingTestTable.remove(bundleId);
  }
  // a hashtable which maps testId to executingTest
  private Hashtable executingTestIdTable = new Hashtable( );
}
```

Similarly, the following example source code illustrates one possible embodiment of an implementation of a test agent module:

```
public class CldcAgent {
  public void run( ) {
    byte[ ] testRequest = null;
    while (true) {
      testRequest = getNextTest( );
      trace("Successfully received information about the next test");
      if (testRequest == null) {
        trace("No more tests in the bundle");
        return;
      }
      byte[ ] res = handleTestDataPack(testRequest);
      sendTestResult(res);
      trace("Successfully sent back the test result");
    }
  }
  private int fromByteArray(byte[ ] bytes) {
    return bytes[0] << 24
      | (bytes[1] & 0xFF) << 16
      | (bytes[2] & 0xFF) << 8
      | (bytes[3] & 0xFF);
  }
  private byte[ ] toByteArray(int value) {
    return new byte[ ] {
      (byte) (value >> 24),
      (byte) (value >> 16),
      (byte) (value >> 8),
      (byte) value};
  }
  private byte[ ] handleTestDataPack(byte[ ] request){
    ByteArrayOutputStream os = new ByteArrayOutputStream( );
    byte[ ] results = null;
    int off = 0;
    int 1 = request.length;
    byte [ ] exec_test = null;
    byte [ ] size = null;
    while(true) {
      if(1 - off < 4) break;
      size = new byte[4];
```

```
        System.arraycopy(request, off, size, 0, 4);
        off +=4;
        int len = fromByteArray(size);
        exec_test = new byte[len];
        if(1 - off < len) break;
        System.arraycopy(request, off, exec_test, 0, len);
            off +=len;
            results = handleRequest(exec_test);
            try {
                os.write(toByteArray(results.length));
                    os.write(results);
            } catch (Exception e) {
                System.out.print("Exception during parsing test data " + e);
            }
            exec_test = null;
            size =null;
        }
        results = os.toByteArray( );
        os = null;
        return results;
    }
}
```

Test Bundling Policy Customization

As described above, traditionally, testing frameworks utilized hard coded bundling policies, such as to determine whether one or more tests should be bundled individually and separately from other tests. In some embodiments, however, rather than using a hardcoded test bundling policy, a user customizable (or modifiable) test bundling policy may be used. Alternatively, a hard coded test bundling policy may be retained as a default policy for use if no custom bundling policy is specified. Thus, in some embodiments various aspects of test bundling and batching may be configurable prior to, or during, execution of a test suite. For example, Test Server Device 110 may present one or more user interface elements allowing a user (e.g., a test designer, developer or user) to customize a test bundling policy used when sending test application bundles, test data batches and test results batches.

As noted above, the bundling policy implementation of a test execution framework may be customized (or modified) in accordance with test suite requirements, rather than using only hardcoded requirements. In some embodiments, a custom user interface may be utilized to collect use input that includes test bundling customization data for modifying the test bundling policy for a test suite. Thus, a user (e.g., a test designer, developer or operator) to customize (or modify) may customize the test bundling policy for individual test suites. The test framework may then execute the test suite in accordance with the modified test bundling policy.

In some embodiments user input may be collected (e.g., via a user interface on the test server device) as test bundling customization data regarding the test bundling policy. Test bundling customization data may be usable to determine whether to bundle individual ones of the tests (e.g., or be executed) with others of the tests. Test bundling customization data may be any of various types of data, according to various embodiments. For instance, a keyword expression may be specified for use in determining whether a test should be bundled separately from other tests, resulting in a test application bundle that includes only a single test, as will be discussed below regarding FIG. 8.

In addition to collecting test bundling customization data, the test server device, may present a user interface (or user interface element) in order to collect user input indicating whether or not to use a keyword expression for customizing a test bundling policy. If a keyword expression is to be used as test bundling customization data for customizing the test bundling policy, a test execution framework, or other module executing on a test server device, may present (or display) one or more user interface elements configured to collect user input specifying a keyword expression, or other test bundling configuration data, usable to determine whether or not to individually bundle certain tests. Thus, the collected test bundling configuration data may be used to modify the (possibly hardcoded) test bundling policy used by the test server device, according to some embodiments.

Figure 7:
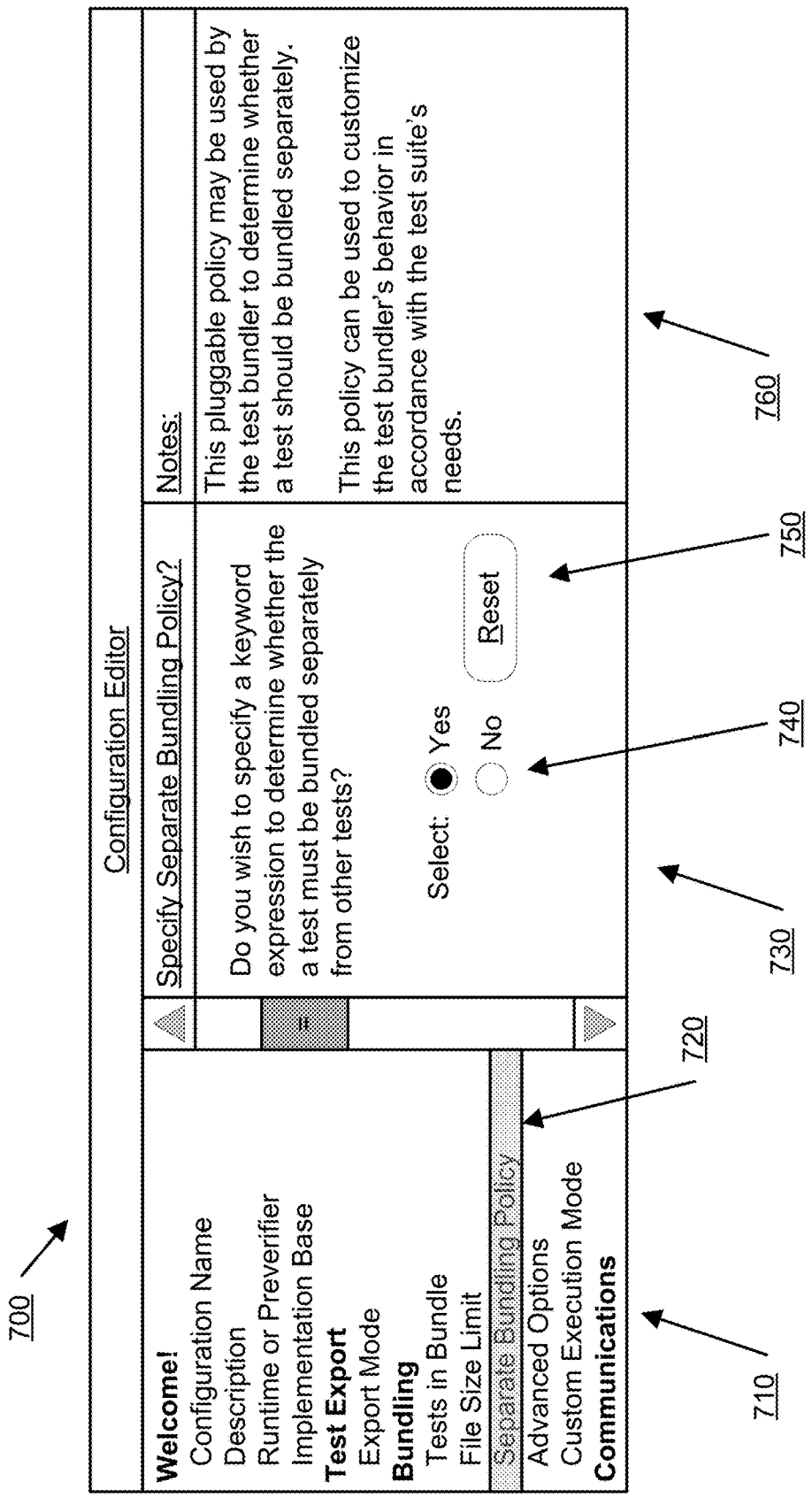
FIG. 7 illustrates an example user interface for specifying whether or not a keyword expression should be used as part of test bundling policy, according to one embodiment.

FIG. 7 illustrates one example embodiment of a user interface for specifying whether or not a keyword expression, or other test bundling customization data, should be used as part of test bundling policy. As shown in FIG. 7, which represents merely one example of how such a user interface may appear and function, a component on Test Server Device 110, such as Execution Server Module 155, Test Provider Module 150, Test Harness 115 or Test Framework 190, may present (or display) a user interface 700 allowing a user to indicate whether or not a keyword expression should be used to determine which, if any, tests should be bundled separately from other tests, (e.g., bundled individually).

For example, user interface 700 may include one or more panes, such as navigation or menu pane 710, which may allow a user to select 720 from among a number of options to adjust. As shown in FIG. 7, a user may have selected to specify a "Separate Bundling Policy". User interface 700 may also include a center pane 730, the content of which may change based on the selection 720 in pane 710. Within pane 730, may be a user editable (or selectable) control 740 allowing specification of whether or not a keyword expression should be used as part of a custom test bundling policy. Additionally, pane 730 may include a reset control 750, which in some embodiments, may return the value in control 740 to a default or to whatever value was last saved via control 740. Furthermore, user interface 700 may include a notes pane 760 providing notes or other information regarding the option(s) currently being specified or adjusted in pane 730.

The value specified via control 740 may be used by Test Harness 115 when bundling tests into a test application bundle for transfer (e.g., sending) to a test device. Thus, if a user specified that a keyword expression should not be used as part of the test bundling policy, then Test Harness 115 may not use any keyword expression when generating test application bundles. If, however, as shown in FIG. 7, a user specifies that a keyword expression should be used as part of a modified test bundling policy, Test Harness 115 may use the specified keyword expression when generating test application bundles, as will be discussed below.

Thus, in some embodiments a keyword expression may be specified for use as part of a custom test bundling policy for use when generating and sending test applications bundles and such a keyword expression may be specified using a user interface provided by Test Server Device 110.

Figure 8:
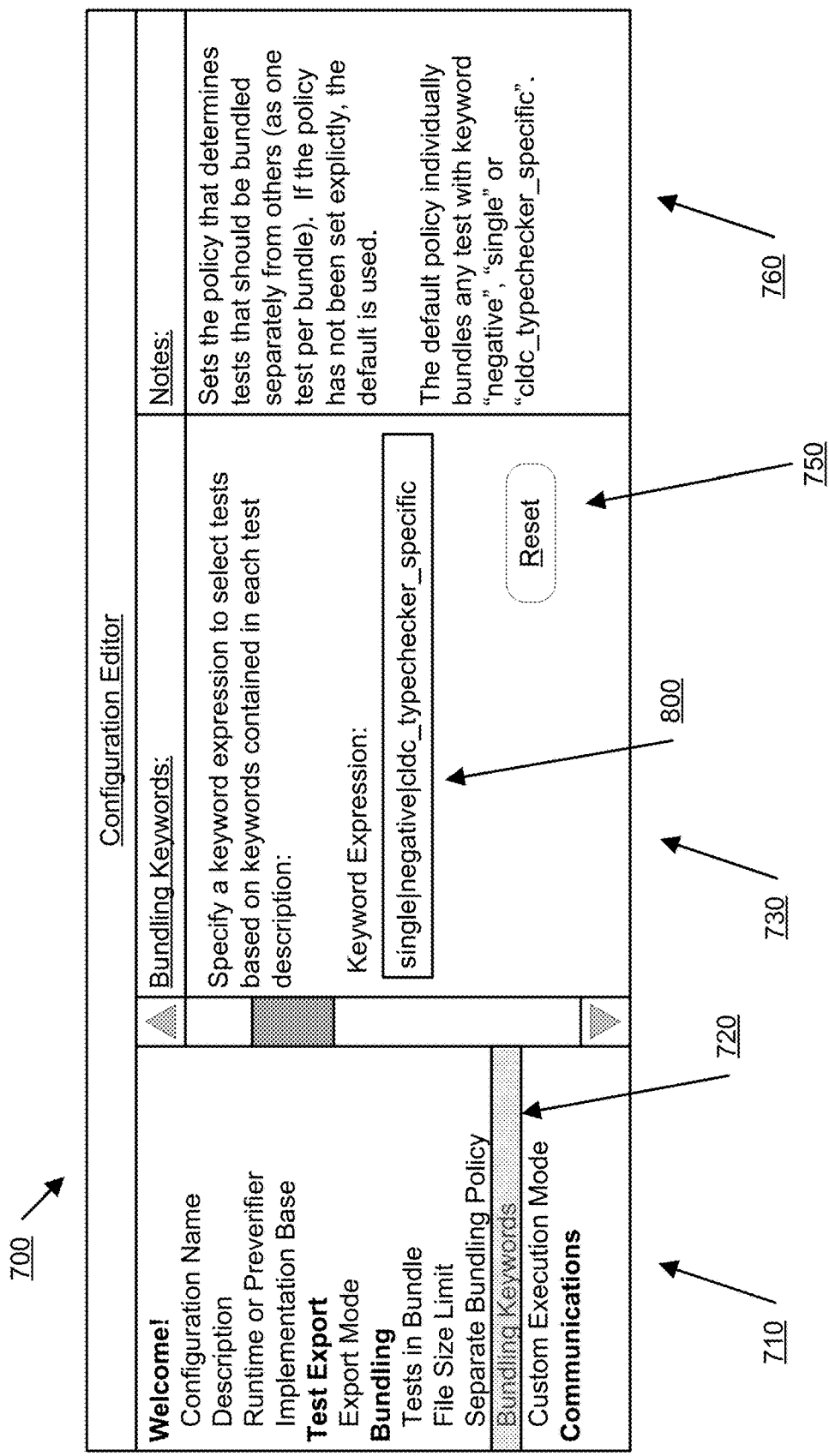
FIG. 8 illustrates an example user interface for collecting user input specifying a bundling keyword expression for use as part of, or to modify, a test bundling policy, according to one embodiment.
Figure 10:
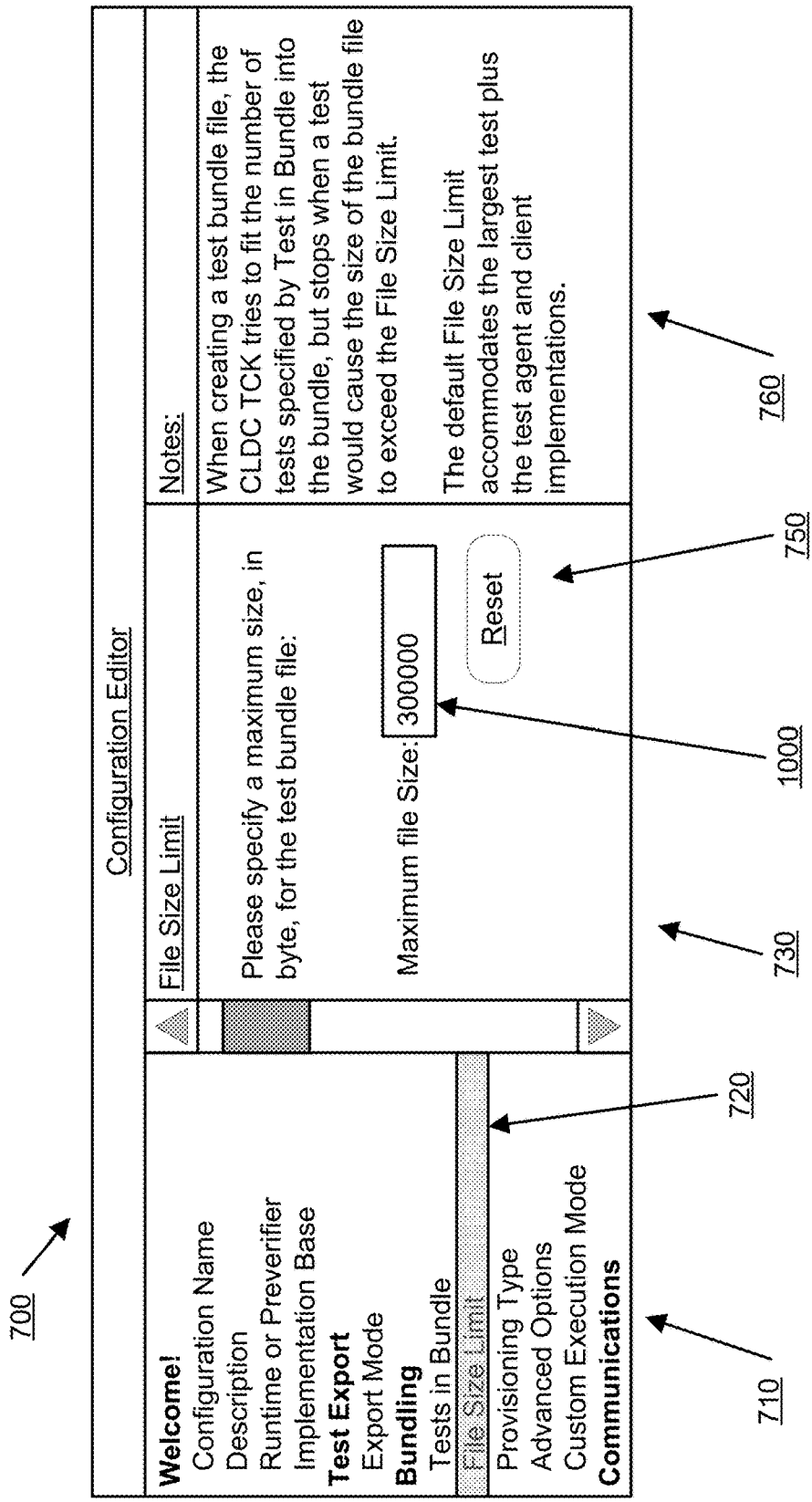
FIG. 10 illustrates an example user interface for configuring the maximum size (e.g., in bytes) for test application bundles, according to one embodiment.

FIG. 8 illustrates one example embodiment of a user interface for collecting user input specifying a bundling keyword expression for use as part of, or to modify, a test bundling policy. As shown in FIG. 10, which represents merely one example of how such a user interface may appear and function, a component on Test Server Device 110, such as Execution Server Module 155 or Test Provider Module 150 may present a user interface 700, as discussed above regarding FIG. 7. However, as illustrated in FIG. 8, selection 720 in pane 710 may have changed, thereby changing the content of panes 730 and 760. In the example illustrated in FIG. 8, selection 720 has been changed to select the "Bundling Keywords" option. Pane 730 may include (e.g., display or present) a user editable control 800 allowing specification of a keyword expression as test bundling customization data usable to modify a test bundling policy for use when generating and sending test applications bundles.

The keyword expression specified via control 800 may be used by Test Server Device 110 when bundling tests into a test application bundle for transfer to a test device. Thus, in some embodiments, Test Provider Module 150, Execution Server Module 155, Test Harness 115, Test Framework 190 and/or another module on Test Server Device 100 may use the specified keyword expression when generating and sending test applications bundles.

In some embodiments, one or more of the tests of a test suite may include, or be associated with, one or more keywords. For example, tests may include test descriptions and the words included in the test description may be considered keywords. Alternatively, in some embodiments, separate keywords may be associated with tests.

In some embodiments, Test Server Device 110 may be configured to use a default (or hardcoded) test bundling policy that may include using a default keyword expression when determining how to bundle tests. For instance, Test Server Device 110 may individually bundle tests with keywords that match, or that result when evaluated against, the keyword expression. In one example embodiment, test bundling polices in an Oracle Java ME TCK test suite may use a default keyword expression as part of a test bundling policy of the ME TCK Framework. In this example embodiment, this default policy may use the following hard-coded keyword expression: "single || negative || cldc_typechecker_specific" to bundle the tests with these keywords separately. Thus, the any test with "single," "negative" or "cldc_typechecker_specific" as a keyword would be bundled independently (e.g., separately or individually) by the test server device, according to that example embodiment.

However, if a user has specified a keyword expression via user control 800 of user interface 700, the test harness may evaluate each test against the specified keyword expression to determine which tests, if any, should be bundled individually, according to some embodiments. Therefore, during performance of a test suite, a test server device, may send to the test device test application bundles that each comprise one or more tests, where any of the tests whose keywords match (e.g., when evaluated against) the specified keyword expression are bundled individually and separately from any other tests, according to some embodiments.

While described above mainly in terms of a keyword expression, other types of text bundling customization data may also be usable to determine whether to individually bundle tests, according to various embodiments. For example, test may be grouped into various categories of tests without the use of actual keywords, and one or more groups may be specified in order to have the tests of a particular group (or groups) individually bundled. In general any suitable means for selecting or indicating one or more tests may be used as test bundling customization data usable to determine whether to individually bundle tests, according to various embodiments.

Figure 9:
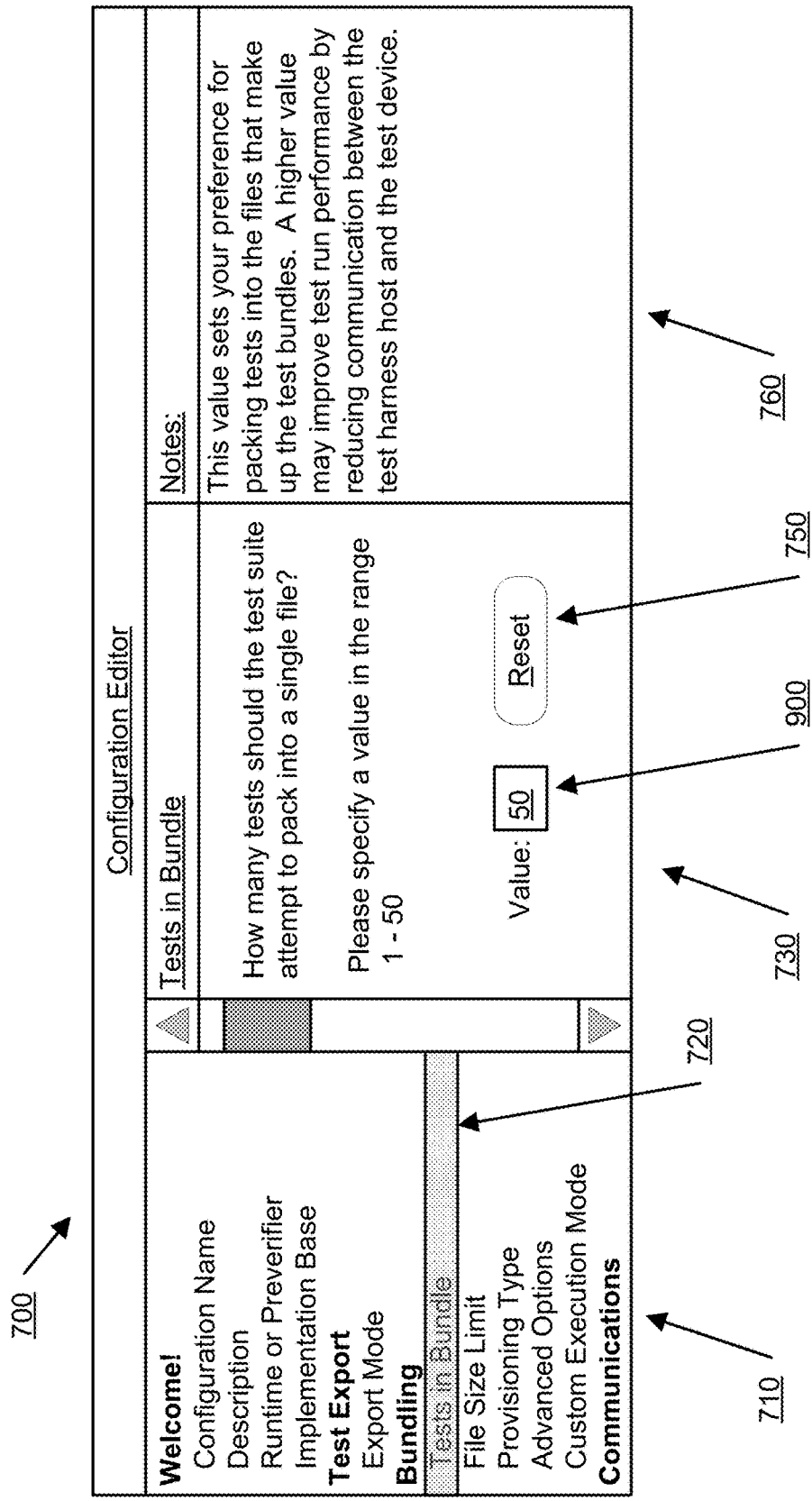
FIG. 9 illustrates an example user interface for configuring the number of tests in a test application bundle, according to one embodiment.

In some embodiments user input specifying other types of test bundling customization data may also be collected and used to modify a test bundling policy. For example, FIG. 9 illustrates one example embodiment of a user interface for configuring a maximum number of tests in a test application bundle. As shown in FIG. 9, which represents merely one example of how such a user interface may appear and function, a component on Test Server Device 110, such as Execution Server Module 155 or Test Provider Module 150 may present a user interface 700, as discussed above regarding FIG. 7. However, as illustrated in FIG. 9, selection 720 in pane 710 may have changed, thereby changing the content of panes 730 and 760. For example, selection 720 may have been changed to select a "Tests in Bundle" user interface element, as shown in FIG. 9. Within pane 730, may be a user editable (or selectable) control 900 allowing specification of a maximum number of tests to bundle together.

The value specified via control 900 may be used by Test Harness 115 when bundling tests into a test application bundle for communication to a test device. Thus, during execution of a test suite, a test harness, as part of a test framework, may send test application bundles that each comprise one or more tests, but where none of the bundles includes more than the number of tests specified via control 740 of user interface 700. While the example text illustrated in pane 730 of FIG. 9 indicates that a maximum number of tests should be specified within a range of 1-50, a different range (or no range limit at all) may be used in different embodiments.

When using a specified maximum number of tests, Test Server Device 100 may be configured to attempt to include as many tests as possible, without exceeding the specified maximum number of tests, in each test application bundle supplied to the test device, according to some embodiments.

Similarly, in some embodiments the maximum size (e.g., in bytes) for test application bundles may vary and be specified using a user interface provided by Test Server Device 110 and Test Harness 115 may then use the specified maximum size when generating and sending test applications bundles.

For example, FIG. 10 illustrates one example embodiment of a user interface for configuring the maximum size (e.g., in bytes) for test application bundles. As shown in FIG. 10, which represents merely one example of how such a user interface may appear and function, a component on Test Server Device 110, such as Execution Server Module 155 or Test Provider Module 150 may present a user interface 700, as discussed above regarding FIG. 7. However, as illustrated in FIG. 10, selection 720 in pane 710 may have changed, thereby changing the content of panes 730 and 760. For instance, in the example illustrated in FIG. 10, selection 720 has been moved to select a "File Size Limit" option. Within pane 730, may be a user editable (or selectable) control 1000 allowing specification of a maximum size for a test application bundle.

The value specified via control 1000 may be used by Test Harness 115 when bundling tests into a test application bundle for communication to a test device. Thus, during execution of a test suite, a test harness, as part of a test framework, may send test application bundles that each comprise one or more tests, where each bundle may include the maximum number of tests (e.g., test applications) whose combined size (e.g., in bytes) is not more than then maximum test application bundle size as indicated by the value specified in user control 1000.

Additionally, when bundling tests into a test application bundle for communication to a test device Test Harness 115 may be configured to use both the specified number of tests, as indicated by the value in user control 900 and the specified maximum file size as indicated by value specified in user control 1000. Thus, during performance of a test suite, a test server device may send test application bundles that each comprise one or more tests, where each bundle may include the maximum number of tests (e.g., test applications) whose combined size (e.g., in bytes) is not more than then maximum test application bundle size as indicated by the value specified in user control 800, but may not include more than the specified maximum number of tests indicated by the value in user control 900

In some embodiments, the user interfaces described herein may be part of a configuration system presented to the user as a test suite interview in which the user (e.g., a test developer, designer, etc.) may be asked multiple questions leading the user through the process of configuration the test suite for execution.

In some embodiments a keyword expression may be specified for filtering the individual tests to be included in the test suite and therefore included in the test application bundles. Test Server Device 110 (e.g., one or more modules executing on Test Server Device 100) may be configured to use the specified keyword expression when generating and sending test applications bundles.

Figure 11:
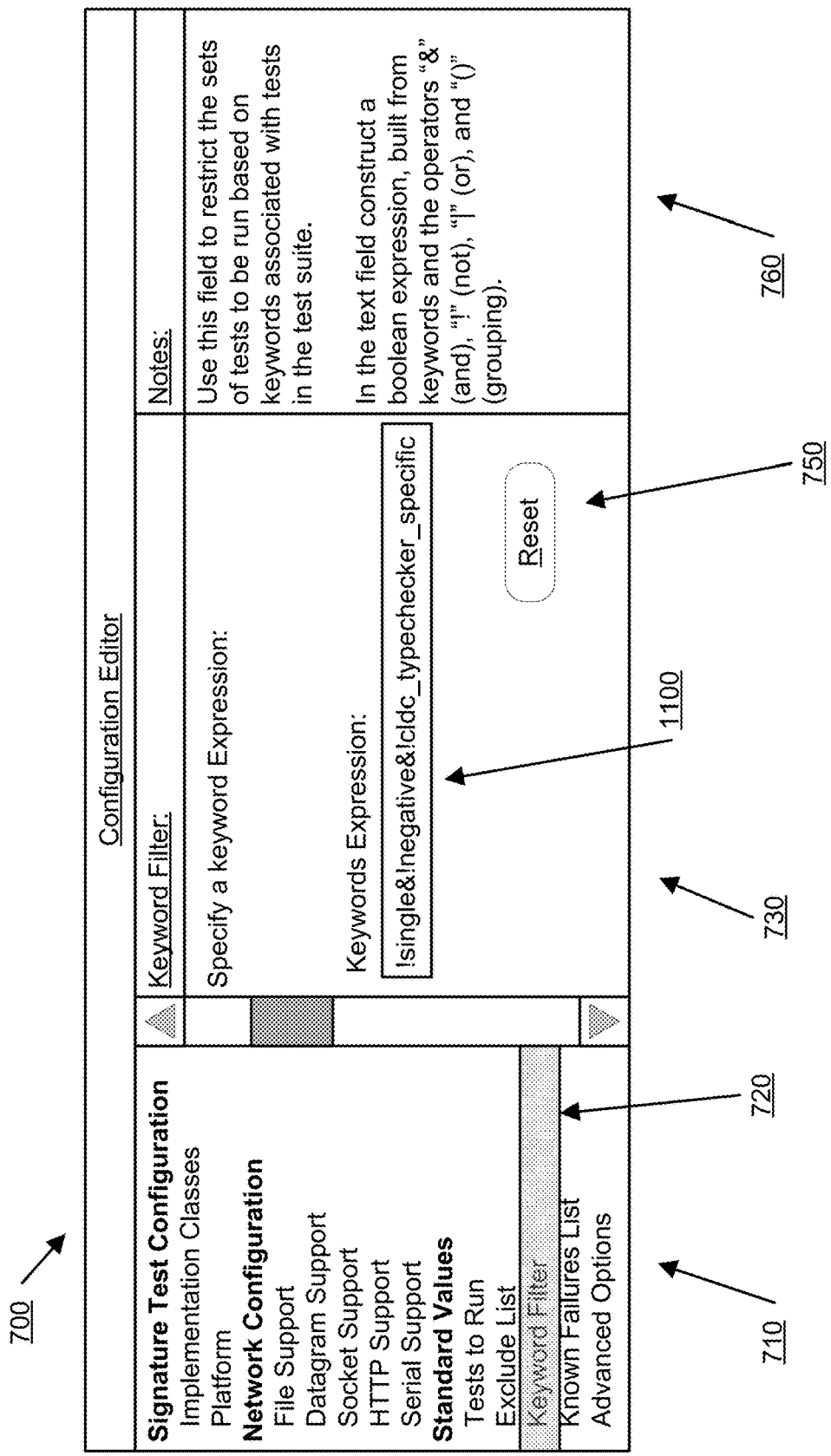
FIG. 11 illustrates an example user interface for filtering tests by keyword, according to one embodiment.

FIG. 11 illustrates one example embodiment of a user interface for specifying a filtering keyword expression for use as part of a test bundling policy. As shown in FIG. 11, which represents merely one example of how such a user interface may appear and function, a component on Test Server Device 110, such as Execution Server Module 155 or Test Provider Module 150 may present a user interface 700, as discussed above regarding FIG. 7. However, as illustrated in FIG. 11, selection 720 in pane 710 may have changed, thereby changing the content of panes 730 and 760. For example, selection 720 in FIG. 11 has been changed to select a "Keyword Filter" option, according to one example embodiment. Within pane 730, may be a user editable (or selectable) control 1100 allowing specification of a filter keyword expression as part of a custom test bundling policy for use when generating and sending test applications bundles.

The keyword expression specified via control 1100 may be used by Test Harness 115 when bundling tests into a test application bundle for communication to a test device. In some embodiments, one or more of the tests of a test suite may include, or be associated with, one or more keywords, according to some embodiments. For example, tests may include test descriptions and the words included in the test description may be considered keywords. Alternatively, in some embodiments, tests may include, or be associated with, specifically identified keywords.

Thus, during execution of a test suite, a test server device may only include tests that have keywords that match the specified filter keywords expression in test application bundles. In other words, a test framework may include individual tests in test application bundles based at least in part on evaluating the keywords of the tests against the specified filter keyword expression. In other embodiments, however, the test harness may exclude tests that have keywords that match the specified filter keyword expression. In the example user interface of FIG. 11, the test harness may be configured to exclude any test that has a keyword of "single," "negative" or "cldc_typechecker_specific."

Figure 12:
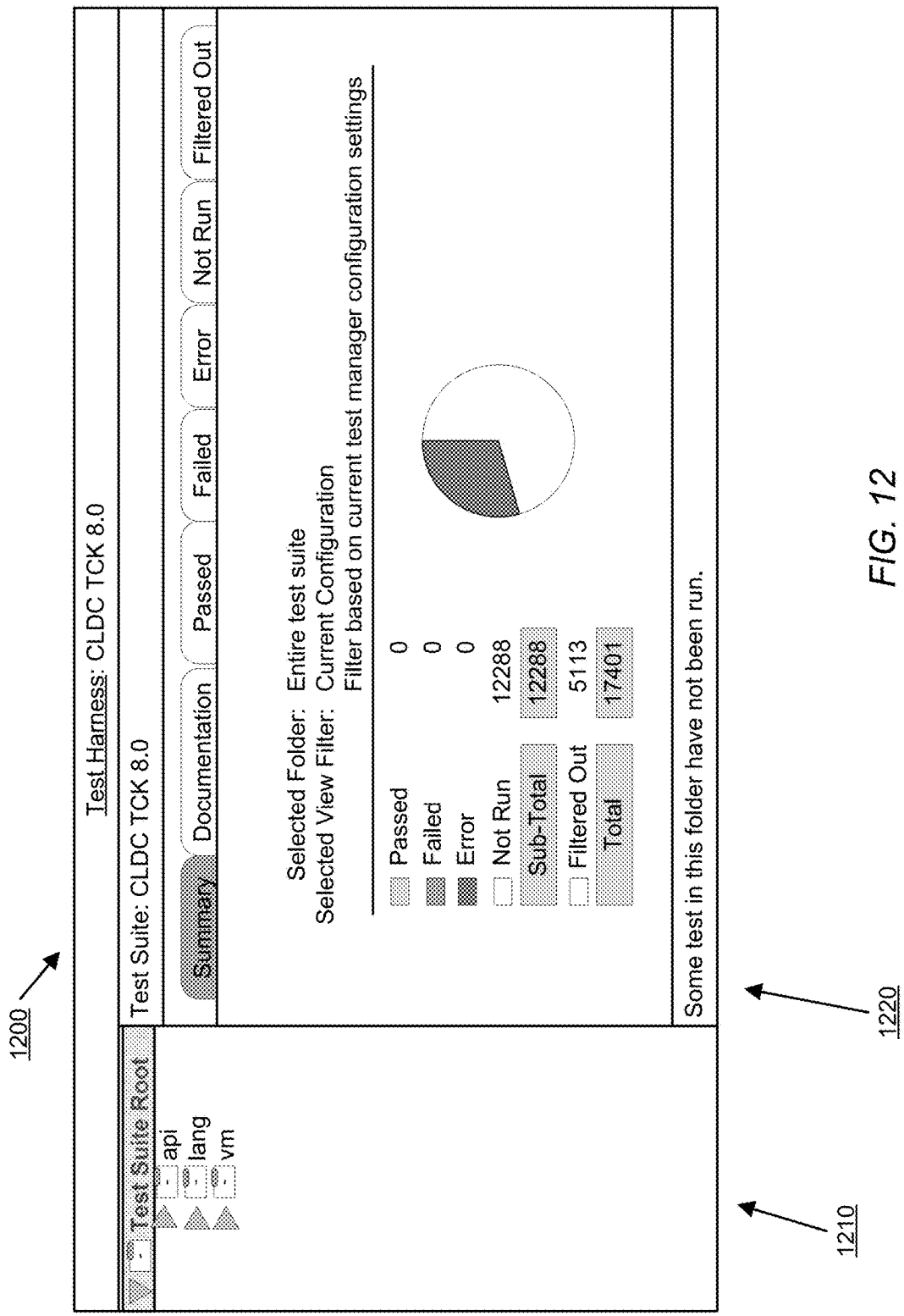
FIG. 12 illustrates an example user interface for displaying test results, according to one embodiment.

Additionally, in some embodiments, Test Service Device 110 may be configured to provide a user interface screen illustrating a summary of a current test suite configuration. FIG. 12 illustrates an example user interface 1200 including a summary of an example embodiment of a test suite configuration. The user interface shown in FIG. 12, which represents merely one example of how such a user interface may appear and function, may include multiple panes, such as navigation pane 1210 and information pane 1220.

Using the example embodiment illustrated in FIGS. 8-11, a test suite of 17,000 tests may be configured. Using the configuration options shown in FIG. 12, the default values for test suite configuration options may be adjusted according to the illustrated example embodiment. For instance, the number of tests option may be adjusted to 50 tests in test application bundle, the maximum file size options may be specified at 300000 bytes, and filter keyword expression may specified to exclude tests with keywords of "single", "negative" or "cldc_typechecker_specific". The user interface shown in FIG. 12 illustrates a summary of such an example test suite configuration.

While described above separately, the example user interface illustrated in FIGS. 7-12 may represent only a portion of a larger user interface for configuring and managing test suite execution including the ability to customize a test bundling policy as described above. Additionally, it should be noted that the user interfaces illustrated in FIGS. 7-12 represent merely single examples of how such user interface may appear and/or function. Furthermore, the same ability to specify and/or customize the configuring and managing of test suite execution including the ability to customize a test bundling policy may also be realized without graphical user interfaces. For example, in some embodiments, a text-based user interface may be utilized while in other embodiments, configuration files may be edited and/or modified to specify the various options discussed above regarding FIGS. 7-12.

As noted above, Test Bundling and Batching Optimizations discussed herein may reduce execution time of test suites as well as test cycle time, thereby increasing the chances of delivering a new product to market in a shorter time. For example, in one example embodiment, test bundling optimizations implemented for the CLDC-TCK-11a test suite may allow a reduction of the number of application downloads from 11845 to 5995 and a test suite execution time reduction of up to 2 times on 3 platforms for JME-E 3.3 project. The following shows the results according to that example embodiment:

| Config. Options | | Total Tests | 11845 |
|---|---|---|---|
| | | Tests in Bundle | 50 |
| | | File Size Limit (KB) | >=300 |
| Hard coded | | single | 0 |
| Bundling Policy | | negative | 3841 |
| keywords | | typechecker | 256 |
| Total | | Test Bundles | 6995 |
| Execution Time | | KEIL | 21 h |
| by Platform | | Raspberry Pi | 3.5 h |
| | | Windows | 2 h |

By way of another example embodiment, a CLDC-TCK 11a test suite may not include tests with the keyword "single" and Oracle Java ME 3.3 implementations may not require that tests with either of the keywords "cldc_typechecker_specific" or "negative" to be bundled separately. Therefore, these keywords can be removed from the bundling keyword expression option, as in user control 1000 of FIG. 10. The table below shows this example, which illustrates a reduction of application downloads from 5995 to 237 and a reduction of test suite execution time of 3.5 times:

| Config. Options | Total Tests | 11845 |
|---|---|---|
| | Tests in Bundle | 50 |
| | File Size Limit (KB) | >=300 |

-continued

| Custom Bundling Policy keywords | single | — |
| --- | --- | --- |
| | negative typechecker | — |
| Total Execution Time by Platform | Test Bundles | 237 |
| | KEIL | 6 h |
| | Raspberry Pi | 1.5 h |
| | Windows | 0.3 h |

Figure 13:
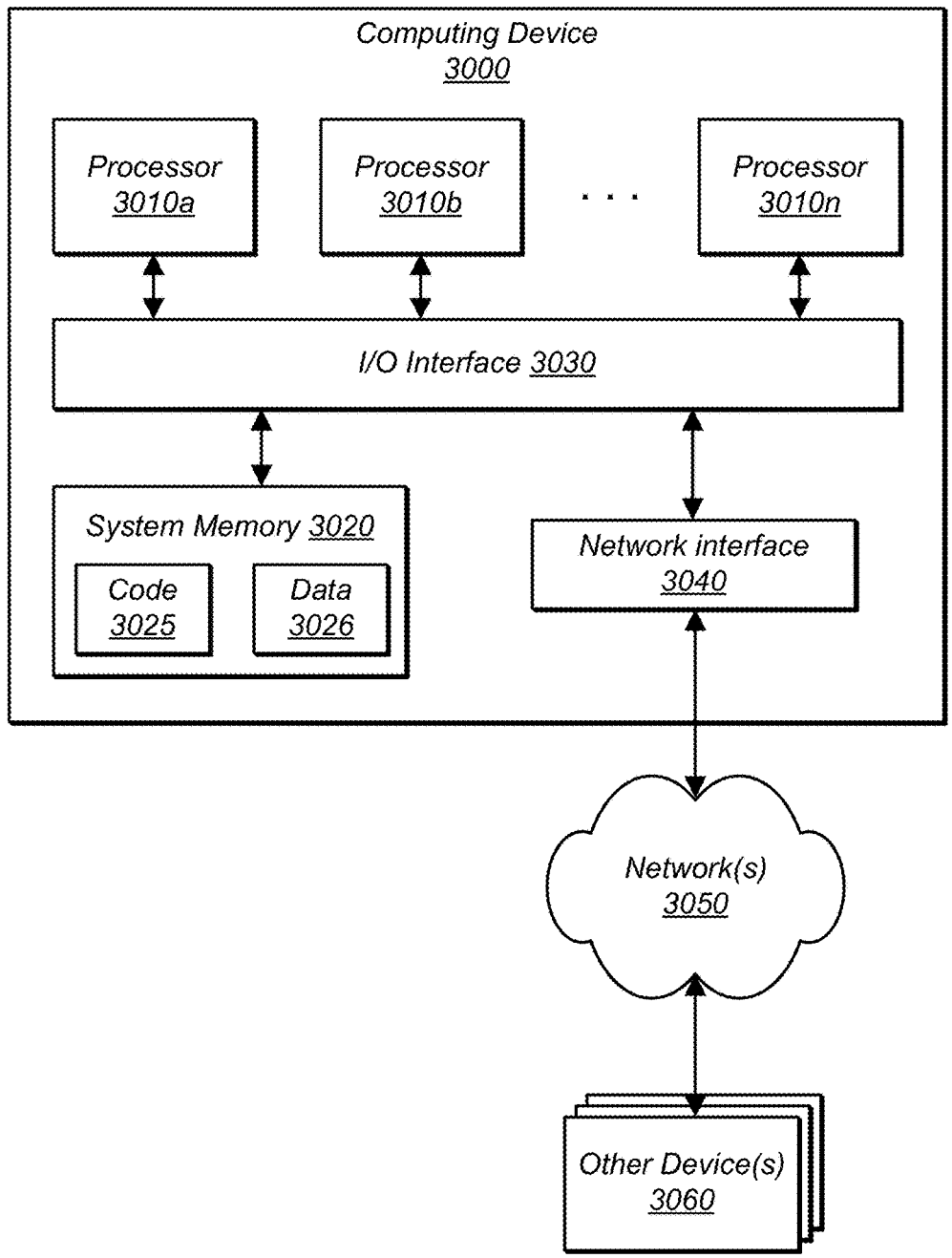
FIG. 13 is a block diagram illustrating one embodiment of a system capable of implementing test bundling and batching optimizations, as described herein.

The techniques described herein for test bundling and batching optimizations may be implemented in any of a wide variety of computing systems. FIG. 13 is a flowchart illustrating one embodiment of a method for Test Bundling and Batching Optimizations, as described herein.

While the embodiments described herein in the detailed description and examples reflect distinct groups of features, these groupings of features are abstractions for the purpose of clarifying some features by elision from view of others that would be practiced in conjunction, and one of skill in the art will readily ascertain in light of having read the present specification that combinations of features described herein different from the particular combinations described herein are contemplated within the scope and intent of this disclosure. Thus, features from different parts of this disclosure and its appendices may be combined without departing from the scope and intent of this disclosure, and one of skill in the art will readily comprehend in light of this disclosure that different elements of the disclosure and its appendices may be combined in ways not clarified herein to preserve the clarity of discussion of the features themselves.

In at least some embodiments, a computer system that implements a portion or all of one or more of the technologies described herein, such as the Test Server Device 110 and/or Test Device 120, may include a general-purpose computer system that includes or is configured to access one or more computer-readable media. FIG. 13 illustrates such a general-purpose computing device 3000 suitable for implementing one embodiment of Test Server Device 110 and/or Test Device 120, as described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing Test Server Device 110 and/or Test Device 120 including Test Harness 115, Test Provider Module 150, Execution Server Module 155, AMS 130, Test Agent 135, Test Client 140 and or Test(s) 145, described above.

In various embodiments, Test Harness 115, Test Provider Module 150, Execution Server Module 155, AMS 130, Test Agent 135, Test Client 140 and or Test(s) 145 (and/or any individual sub-modules thereof) may each be implemented in any of various programming languages or methods. For example, in one embodiment, Test Harness 115, Test Provider Module 150, Execution Server Module 155, AMS 130, Test Agent 135, Test Client 140 and or Test(s) 145 may be written in any of the C, C++, assembly, JAVA or other general purpose programming languages, while in another embodiment, one or more of them may be written using a different, more specialized, programming language. Moreover, in some embodiments, Test Harness 115, Test Provider Module 150, Execution Server Module 155, AMS 130, Test Agent 135, Test Client 140 and or Test(s) 145 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1 through 12 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by Test Provider 150 may, in some embodiments, be performed by Execution Server Module 155 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
  performing a test suite on a network connected test device, wherein the test suite comprises a plurality of tests to be executed on the test device, wherein a test server device is configured to communicate with the test device, via a connection-based communication protocol, to coordinate execution of the plurality of tests, and wherein said performing comprises:
    establishing, according to the connection-based communication protocol, a connection for transferring test data between the test server device and the test device;
    sending, over the connection from the test server device to the test device, a batch of test data for executing, on the test device, tests of a test application bundle, wherein the test application bundle comprises two or more tests of the plurality of tests, and wherein all the test data for the two or more tests is sent as a batch over the connection;
    closing the connection;
    executing the two or more tests on the test device to produce respective test results from each of the two or more tests;
    batching the respective test results from each of the two or more tests on the test device to generate a batch of test results;
    establishing, according to the connection-based communication protocol, another connection for transferring test results between the test device and the test server device;
    sending, over the other connection from the test device to the test server device, the batch of test results, wherein the test results from each of the two or more tests are sent as the batch of test results over the other connection; and
    closing the other connection.

2. The method of claim 1, further comprising sending, over the connection from the test device to the test server device, a request for a next batch of test data, wherein said sending the batch of test data is performed by the test server device in response to receiving the request for a next batch of test data.

3. The method of claim 1, wherein test data for individual tests of the two or more tests are not communicated over separate, individual, connections of the connections-based communication protocol, and wherein test results for individual tests of the two or more tests are not communicated over separate, individual, connections of the connections-based communication protocol.

4. The method of claim 1, further comprising:
  repeatedly performing, until the plurality of tests of the test suite have been executed:
    sending additional batches of test data comprising tests for tests of additional test application bundles from the test server device to the test device,
      wherein each respective additional batch of test data is communicated over a respective connection of the connection-based communication protocol,
      wherein all test data for a respective additional batch of test data are communicated over the respective connection, and wherein the respective connection is established for sending the respective additional batch of test data and closed after sending the respective additional batch of test data; and sending, for each respective additional batch of test data, an additional batch of test results from the test device to the test server device, wherein each respective additional batch of test results is communicated over a respective additional connection of the connection-based communication protocol, wherein all test results of a respective additional batch of test results are sent over the respective additional connection, and wherein the respective connection is established for sending the respective additional batch of test results and closed after sending the respective additional batch of test results.

5. The method of claim 4, wherein a total number of connections of the connection-based communication protocol used during said performing the test suite is on the order of a total number of test application bundles and not on the order of a total number of tests executed on the test device.

6. The method of claim 1, further comprising:
establishing, according to the connection-based communication protocol, a first connection for transferring the test application bundle from the test server device to the test device;
sending over the first connection from the test server device to the test device, the test application bundle, wherein the two or more tests of the test application bundle are sent as the test application bundle over the first connection; and
closing the first connection, wherein said establishing the first connection and said sending the test application bundle are performed prior to said establishing the connection for transferring test data.

7. The method of claim 1, wherein the test application bundle comprises a test agent executable on the test device to manage execution of the two or more tests, the method further comprising launching the test agent on the test device, wherein the test agent is configured to:
perform said establishing the connection to transfer the test data;
perform said sending the request for a next batch of test data;
perform said establishing the other connection; and
perform said sending over the other connection, the batch of test results.

8. A system, comprising:
one or more processors; and
a memory coupled to the one or more processors, the memory comprising program instructions that when executed cause the one or more processors to perform:
performing a test suite on a network connected test device, wherein the test suite comprises a plurality of tests to be executed on the test device, wherein a test server device is configured to communicate with the test device, via a connection-based communication protocol, to coordinate execution of the plurality of tests, and wherein said performing comprises:
establishing, according to the connection-based communication protocol, a connection for transferring test data between the test server device and the test device;
sending, over the connection from the test server device to the test device, a batch of test data for executing, on the test device, tests of a test application bundle, wherein the test application bundle comprises two or more tests of the plurality of tests, and wherein all the test data for the two or more tests is sent as a batch over the connection;
closing the connection;
executing the two or more tests on the test device to produce respective test results from each of the two or more tests;
batching the respective test results from each of the two or more tests on the test device to generate a batch of test results;
establishing, according to the connection-based communication protocol, another connection for transferring test results between the test device and the test server device;
sending, over the other connection from the test device to the test server device, the batch of test results, wherein the test results from each of the two or more tests are sent as the batch of test results over the other connection; and
closing the other connection.

9. The system of claim 8, wherein the program instructions, when executed, further cause the one or more processors to perform: sending, over the connection from the test device to the test server device, a request for a next batch of test data, wherein said sending the batch of test data is performed by the test server device in response to receiving the request for a next batch of test data.

10. The system of claim 8, wherein test data for individual tests of the two or more tests are not communicated over separate, individual, connections of the connection-based communication protocol, and wherein test results for individual tests of the two or more tests are not communicated over separate, individual, connections of the connection-based communication protocol.

11. The system of claim 8, wherein the program instructions, when executed, further cause the one or more processors to perform:
repeatedly performing, until the plurality of tests of the test suite have been executed:
sending additional batches of test data comprising tests for tests of additional test application bundles from the test server device to the test device,
wherein each respective additional batch of test data is communicated over a respective connection of the connection-based communication protocol,
wherein all test data for a respective additional batch of test data are communicated over the respective connection, and
wherein the respective connection is established for sending the respective additional batch of test data and closed after sending the respective additional batch of test data; and
sending, for each respective additional batch of test data, an additional batch of test results from the test device to the test server device,
wherein each respective additional batch of test results is communicated over a respective additional connection of the connection-based communication protocol,
wherein all test results of a respective additional batch of test results are sent over the respective additional connection, and
wherein the respective connection is established for sending the respective additional batch of test results and closed after sending the respective additional batch of test results.

12. The system of claim 11, wherein a total number of connections of the connection-based communication protocol used during said performing the test suite is on the order of a total number of test application bundles and not on the order of a total number of tests executed on the test device.

13. The system of claim 8, wherein the program instructions, when executed, further cause the one or more processors to perform:
establishing, according to the connection-based communication protocol, a first connection for transferring the test application bundle from the test server device to the test device;
sending over the first connection from the test server device to the test device, the test application bundle, wherein the two or more tests of the test application bundle are sent as the test application bundle over the first connection; and
closing the first connection, wherein said establishing the first connection and said sending the test application bundle are performed prior to said establishing the connection for transferring test data.

14. The system of claim 8,
wherein the test application bundle comprises a test agent executable on the test device to manage execution of the two or more tests;
wherein the program instructions, when executed, further cause the one or more processors to perform: launching the test agent on the test device; and
wherein the program instructions, when executed, cause the test agent to perform:
said establishing the connection to transfer the test data;
said sending the request for a next batch of test data;
said establishing the other connection; and
said sending the batch of test results over the other connection.

15. A non-transitory, computer-accessible storage medium comprising program instructions executable on one or more computers to implement:
performing a test suite on a network connected test device, wherein the test suite comprises a plurality of tests to be executed on the test device, wherein the test device is configured to communicate with a test server device, via a connection-based communication protocol, to coordinate execution of the plurality of tests, and wherein said performing comprises:
establishing, according to the connection-based communication protocol, a connection for transferring test data between the test server device and the test device;
receiving, over the connection from the test server device by the test device, a batch of test data for executing, on the test device, tests of a test application bundle, wherein the test application bundle comprises two or more tests of the plurality of tests, and wherein all the test data for the two or more tests is sent as a batch over the connection;
closing the connection;
executing the two or more tests on the test device to produce respective test results from each of the two or more tests;
batching the respective test results from each of the two or more tests on the test device to generate a batch of test results;
establishing, according to the connection-based communication protocol, another connection for transferring test results between the test device and the test server device;
sending, over the other connection from the test device to the test server device, the batch of test results, wherein the test results from each of the two or more tests are sent as the batch of test results over the other connection; and
closing the other connection.

16. The non-transitory, computer-accessible storage medium of claim 15, wherein the program instructions are further executable to implement: sending, over the connection from the test device to the test server device, a request for a next batch of test data, wherein said sending the batch of test data is performed by the test server device in response to receiving the request for a next batch of test data.

17. The non-transitory, computer-accessible storage medium of claim of claim 15, wherein test data for individual tests of the two or more tests are not communicated over separate, individual, connections of the connection-based communication protocol, and wherein test results for individual tests of the two or more tests are not communicated over separate, individual, connections of the connection-based communication protocol.

18. The non-transitory, computer-accessible storage medium of claim of claim 15, wherein the program instructions are further executable to perform:
repeatedly performing, until the plurality of tests of the test suite have been executed:
sending additional batches of test data comprising tests for tests of additional test application bundles from the test server device to the test device,
wherein each respective additional batch of test data is communicated over a respective connection of the connection-based communication protocol,
wherein all test data for a respective additional batch of test data are communicated over the respective connection, and
wherein the respective connection is established for sending the respective additional batch of test data and closed after sending the respective additional batch of test data; and
sending, for each respective additional batch of test data, an additional batch of test results from the test device to the test server device,
wherein each respective additional batch of test results is communicated over a respective additional connection of the connection-based communication protocol,
wherein all test results of a respective additional batch of test results are sent over the respective additional connection, and
wherein the respective connection is established for sending the respective additional batch of test results and closed after sending the respective additional batch of test results.

19. The non-transitory, computer-accessible storage medium of claim of claim 18, wherein a total number of connections of the connection-based communication protocol used during said performing the test suite is on the order of a total number of test application bundles and not on the order of a total number of tests executed on the test device.

20. The non-transitory, computer-accessible storage medium of claim of claim 15, wherein the program instructions are further executable to perform:

establishing, according to the connection-based communication protocol, a first connection for transferring the test application bundle from the test server device to the test device;

sending over the first connection from the test server device to the test device, the test application bundle, wherein the two or more tests of the test application bundle are sent as the test application bundle over the first connection; and closing the first connection, wherein said establishing the first connection and said sending the test application bundle are performed prior to said establishing the connection for transferring test data.

* * * * *

UNITED STATES PATENT AND TRADEMARK OFFICE
CERTIFICATE OF CORRECTION

PATENT NO. : 10,146,678 B2  
APPLICATION NO. : 14/404326  
DATED : December 4, 2018  
INVENTOR(S) : Alexeevich et al.

Page 1 of 1

It is certified that error appears in the above-identified patent and that said Letters Patent is hereby corrected as shown below:

In the Drawings

On sheet 7 of 12, in FIG. 8, under Reference Numeral 760, Line 6, delete "explictly," and insert -- explicitly, --, therefor.

In the Specification

In Column 6, Line 26, after "embodiment" insert -- . --.

In Column 7, Line 60, delete "may by" and insert -- may be --, therefor.

In Column 21, Line 7, after "900" insert -- . --.

In Column 24, Line 7, delete "and or" and insert -- and/or --, therefor.

In Column 24, Line 11, delete "and or" and insert -- and/or --, therefor.

In Column 24, Line 16, delete "and or" and insert -- and/or --, therefor.

In Column 24, Line 23, delete "and or" and insert -- and/or --, therefor.

In the Claims

In Column 30, Line 20, in Claim 17, delete "of claim of claim" and insert -- of claim --, therefor.

In Column 30, Line 28, in Claim 18, delete "of claim of claim" and insert -- of claim --, therefor.

In Column 30, Line 60, in Claim 19, delete "of claim of claim" and insert -- of claim --, therefor.

In Column 30, Line 66, in Claim 20, delete "of claim of claim" and insert -- of claim --, therefor.

Signed and Sealed this  
Twenty-sixth Day of November, 2019

Andrei Iancu  
*Director of the United States Patent and Trademark Office*